United States Patent
Kubo et al.

(10) Patent No.: US 10,957,491 B2
(45) Date of Patent: Mar. 23, 2021

(54) ELECTROLYTIC CAPACITOR-SPECIFIC ELECTRODE MEMBER AND ELECTROLYTIC CAPACITOR

(71) Applicants: JAPAN CAPACITOR INDUSTRIAL CO., LTD., Fussa (JP); MURATA MANUFACTURING CO., LTD., Nagaokakyo (JP)

(72) Inventors: Hiroshi Kubo, Fussa (JP); Nami Kanaya, Fussa (JP); Kazumasa Fujimoto, Nagaokakyo (JP); Tomoki Nobuta, Nagaokakyo (JP)

(73) Assignees: JAPAN CAPACITOR INDUSTRIAL CO., LTD., Tokyo (JP); MURATA MANUFACTURING CO., LTD., Nagaokakyo (JP)

( * ) Notice: Subject to any disclaimer, the term of this patent is extended or adjusted under 35 U.S.C. 154(b) by 126 days.

(21) Appl. No.: 16/333,506

(22) PCT Filed: Sep. 16, 2016

(86) PCT No.: PCT/JP2016/077594
§ 371 (c)(1),
(2) Date: Mar. 14, 2019

(87) PCT Pub. No.: WO2018/051520
PCT Pub. Date: Mar. 22, 2018

(65) Prior Publication Data
US 2019/0259542 A1 Aug. 22, 2019

(51) Int. Cl.
*H01G 9/028* (2006.01)
*H01G 9/042* (2006.01)
(Continued)

(52) U.S. Cl.
CPC .............. *H01G 9/048* (2013.01); *H01G 9/028* (2013.01); *H01G 9/042* (2013.01); *H01G 9/045* (2013.01);
(Continued)

(58) Field of Classification Search
CPC .. H01G 2009/0412; H01G 9/048; H01G 9/04; H01G 9/15; H01G 9/045;
(Continued)

(56) References Cited

U.S. PATENT DOCUMENTS 2,461,410 A 2/1949 Clark
3,325,698 A 6/1967 Mooneyhan
(Continued)

FOREIGN PATENT DOCUMENTS

EP 2 261 933 A1 12/2010
EP 2 897 143 A1 7/2015
(Continued)

OTHER PUBLICATIONS

Aug. 22, 2019 Extended Serch Report issued in European Patent Application No. 16916300.3.
(Continued)

*Primary Examiner* — Arun Ramaswamy
(74) *Attorney, Agent, or Firm* — Oliff PLC

(57) ABSTRACT

An electrolytic capacitor-specific electrode member is used for an electrolytic capacitor, and formed in a wire shape. The electrolytic capacitor-specific electrode member has an outer surface including at least one or more first cavity portions opened to outside, and at least one or more second cavity portions opened at least to the first cavity portions. The second cavity portions are smaller in opening diameter represented by a circle equivalent diameter than the first cavity portions.

7 Claims, 16 Drawing Sheets

(51) Int. Cl.
- *H01G 9/045* (2006.01)
- *H01G 9/048* (2006.01)
- *H01G 9/15* (2006.01)
- *H01G 9/052* (2006.01)
- *H01G 9/055* (2006.01)

(52) U.S. Cl.
CPC ............ *H01G 9/052* (2013.01); *H01G 9/055* (2013.01); *H01G 9/15* (2013.01)

(58) Field of Classification Search
CPC ........ H01G 9/042; H01G 9/028; H01G 9/052; H01G 9/055
USPC .................. 361/502, 523, 528, 527, 529
See application file for complete search history.

(56) References Cited

U.S. PATENT DOCUMENTS

| | | | |
|---|---|---|---|
| 3,825,802 A * | 7/1974 | Kumagai | H01G 9/15 361/529 |
| 6,038,124 A | 3/2000 | Uchi et al. | |
| 2001/0038881 A1 | 11/2001 | Welsch et al. | |
| 2002/0149902 A1 | 10/2002 | Yamazaki et al. | |
| 2006/0164189 A1 | 7/2006 | Tohya et al. | |
| 2009/0303661 A1 | 12/2009 | Katano et al. | |
| 2016/0064152 A1 * | 3/2016 | Gardner | H01G 11/32 361/502 |
| 2016/0181021 A1 | 6/2016 | Kwak et al. | |

FOREIGN PATENT DOCUMENTS

| | | |
|---|---|---|
| JP | S56-112716 A | 9/1981 |
| JP | S57-007918 A | 1/1982 |
| JP | S60-190392 A | 9/1985 |
| JP | S61-278124 A | 12/1986 |
| JP | H2-239610 A | 9/1990 |
| JP | H2-288217 A | 11/1990 |
| JP | H3-104207 A | 5/1991 |
| JP | H10-189398 A | 7/1998 |
| JP | H11-307400 A | 11/1999 |
| JP | 2001-143972 A | 5/2001 |
| JP | 2002-246274 A | 8/2002 |
| JP | 2008-060124 A | 3/2008 |
| JP | 2008-078330 A | 4/2008 |
| JP | 2008-177199 A | 7/2008 |
| JP | 2008-177200 A | 7/2008 |
| JP | 2008-266746 A | 11/2008 |
| JP | 2012-55855 A | 3/2012 |
| WO | 2004/023597 A1 | 3/2004 |
| WO | 2007/058242 A1 | 5/2007 |

OTHER PUBLICATIONS

Nov. 29, 2016 International Search Report issued in International Patent Application PCT/JP2016/077594.

* cited by examiner

ELECTROLYTIC CAPACITOR-SPECIFIC ELECTRODE MEMBER AND ELECTROLYTIC CAPACITOR

TECHNICAL FIELD

The present invention relates to an electrolytic capacitor-specific electrode member (an electrode member for electrolytic capacitor) and an electrolytic capacitor.

BACKGROUND ART

A capacitor has a capacitance proportional to the surface area of a dielectric formed on an electrode member. Thus, as one method for increasing the capacitance of an electrolytic capacitor, the surface area of an electrode member used therefor is conventionally increased. As specific methods, for example, the surface of an electrode member is roughened, and a sintered body is used for an electrode member.

FIG. 15 is a diagram schematically showing a conventional electrolytic capacitor. FIG. 15 does not show a separator. As shown in FIG. 15, an electrolytic capacitor includes: an anode body 1; a dielectric 2 formed on anode body 1; an electrolyte 3 disposed adjacent to dielectric 2 on the opposite side to anode body 1; a cathode body 5 disposed to face anode body 1 with electrolyte 3 interposed therebetween; and a dielectric 4 formed on cathode body 5 so as to be adjacent to electrolyte 3.

The capacitance of the electrolytic capacitor is equal to a combined capacitance obtained from a series connection of: a capacitor formed of anode body 1, dielectric 2 and electrolyte 3; and a capacitor formed of electrolyte 3, dielectric (natural oxide film) 4 and cathode body 5. Generally, cathode body 5 to be employed has a sufficiently high capacitance as compared with anode body 1. Thus, the capacitance of the electrolytic capacitor is significantly influenced by the value of the capacitance of the capacitor formed of anode body 1, dielectric 2 and electrolyte 3.

Even if the surface of anode body 1 is formed to have complicated projections and depressions as much as possible, but when there is a portion where dielectric 2 and electrolyte 3 formed on anode body 1 are not in contact with each other, that is, when electrolyte impregnation is not sufficiently achieved, the capacitance of the electrolytic capacitor is decreased accordingly.

This impregnation performance of the electrolyte is important particularly to, among electrolytic capacitors, a solid electrolytic capacitor formed using a solid electrolyte such as a conductive polymer as an electrolyte.

FIG. 16 is a diagram schematically showing the degree of impregnation with a solid electrolyte in a conventional electrolytic capacitor-specific electrode member. FIG. 16 mainly shows the state of contact between dielectric 2 and electrolyte 3 shown in FIG. 15. As shown in FIG. 16, even if a large number of microscopic projections and depressions are formed on the surface of anode body 1 to increase the surface area of anode body 1 as much as possible, but when the sizes of the projections and depressions are not sufficiently large as compared with the diameter of each conductive polymer, there occurs a large area where solid electrolyte 6 as an electrolyte is not in contact with dielectric 2. In other words, the capacitance appearance ratio showing the proportion of the capacitance obtained by impregnation with a solid electrolyte to the capacitance obtained by impregnation with an electrolyte is decreased.

Thus, the following proposals have been made until now for the electrolytic capacitor-specific electrode member formed in a foil shape or a plate shape.

In Japanese Patent Laying-Open No. 2008-078330 (PTD 1), a too small etching pit diameter prevents sufficient impregnation with a solid electrolyte, and mixing of a large etching pit diameter leads to nonuniform impregnation, which causes a problem that an ESR is increased when an electrolytic capacitor is fabricated. In contrast, PTD 1 proposes an aluminum electrode plate for electrolytic capacitor as follows. Specifically, at least one side surface of the aluminum electrode plate for electrolytic capacitor has an etching layer of 70 µm or more from its surface in the depth direction.

By an image analysis apparatus, the plane cross section of the etching layer at the position 20 µm deep from the surface is measured. According to the measurement results, on each of the measured planes of the etching layer, the number of pits each having a pit diameter of 0.01 µm to 1 µm converted into a circle is equal to 70% or more of the total number of pits in the measured plane.

Japanese Patent Laying-Open No. 02-288217 (PTD 2) discloses a solid electrolytic capacitor formed using, as a solid electrolyte, a conductive polymer film including: a conductive polymer film formed by chemical oxidation polymerization; and a conductive polymer film formed thereon by electrolytic polymerization. In this case, there is a problem that the obtained capacitance varies depending on the roughened electrode foil to be used. In order to address the above-described problem, PTD 2 focuses attention on the relation between formation of a conductive polymer film and roughening of valve action metal, to find the maximum pit depth at which a conductive polymer film can be formed by chemical oxidation polymerization, to thereby propose a roughened electrode foil in which the pit depth of the valve action metal having a dielectric oxide film formed thereon is 16 µm or more on average.

In Japanese Patent Laying-Open No. 2001-143972 (PTD 3), there is a problem that the increasing demands to increase the capacitance cannot be fulfilled only by providing protrusions and cavities on the foil surface. In order to address the above-described problem, PTD 3 proposes an aluminum foil for electrolytic capacitor electrode. Specifically, the aluminum foil for electrolytic capacitor electrode is provided as an aluminum foil having a surface provided with a large number of primary cavities each having an opening diameter (d1) as a circle equivalent diameter of 0.1 µm to 5 µm. These primary cavities include: (i) primary cavities satisfying the condition that the maximum inner diameter (d2) is larger than the opening diameter (d1) so as to have an largely expanded inner portion, in which the opening diameter (d1)/the maximum inner diameter (d2) is less than 0.9; and (ii) primary cavities satisfying the condition that each primary cavity is provided with one or more secondary cavities opened to the inside thereof, in which an opening diameter (d3) of at least one of these secondary cavities is ½ or less of the opening diameter (d1) of the primary cavity. There are 20% or more of (i) primary cavities and (ii) primary cavities in total in the aluminum foil.

Japanese Patent Laying-Open No. 03-104207 (PTD 4) discloses the following problem. Specifically, the conventional combined etching of direct-current (DC) etching and alternating-current (AC) etching does not allow a sufficiently large average opening diameter of a tunnel-shaped pit produced by DC etching in the preceding stage. Thus, even when AC etching is performed in the subsequent stage, etching on the inner wall surface of the tunnel-shaped pit hardly progresses, but only the electrode surface portion is uniformly dissolved, so that a desired area increasing effect cannot be achieved. In order to address the above-described problem, PTD 4 proposes a method of etching an electrolytic capacitor-specific electrode, by which a pit having an opening diameter less than 1 μm is formed by the first DC etching, and then, the opening diameter is enlarged to 1 μm to 4 μm by the second DC etching, which is then subjected to AC etching.

Japanese Patent Laying-Open No. 11-307400 (PTD 5) discloses a method of manufacturing a solid electrolytic capacitor-specific electrode foil, in which the step of providing a separation, by masking, between an etching portion to be etched and a non-etching portion not to be etched is first performed. In this case, as a method of etching the etching portion, the etching portion is subjected to DC etching and then immersed in an electrolytic solution for AC etching to gradually increase the current density of AC etching, which is followed by AC etching at a constant current.

As described above, the conventional technique has been summarized in view of capacitance while focusing attention on the capacitance appearance ratio, but the characteristics required for the electrolytic capacitor are not only capacitance. For example, a practical capacitor includes a defective dielectric that does not serve as a complete insulator. Accordingly, when a DC voltage is applied to the capacitor, any minimal leakage current occurs, which may have an adverse effect upon a circuit. This causes a strong demand to reduce such a leakage current, with the result that the following proposals have been made until now.

Japanese Patent Laying-Open No. 2008-177199 (PTD 6) and Japanese Patent Laying-Open No. 2008-177200 (PTD 7) each disclose that a foil-shaped electrode member is used. In this case, even if the electrode is reduced in width for size reduction, the proportion of the area of the end face to the apparent area of the electrode is increased accordingly. This causes a problem that the adverse effect of the dielectric on the end face formed by aging becomes significant, that is, the leakage current in a solid electrolytic capacitor is increased in accordance with size reduction. In order to address the above-described problem, PTD 6 and PTD 7 each propose that an aluminum wire etched as an anode body and having a surface with a dielectric formed thereon is wound in a spiral shape.

Japanese Patent Laying-Open No. 61-278124 (PTD 8) discloses the following problem. Specifically, a sintered-type capacitor including an anode made of aluminum is cheaper in material than that including an anode made of tantalum. However, this sintered-type capacitor is not only difficult to be reduced in size and increased in capacity but also is not advantageous in terms of cost as compared with a foil-shaped and winding-type aluminum electrolytic capacitor. In order to address the above-described problem, PTD 8 proposes a method of manufacturing an anode body by continuously supplying a linear-shaped valve action metal and roughening the surface of the metal to thereby form an oxide film.

Furthermore, the materials used for an electrode member are not for an electrolytic capacitor-specific electrode member but for an electric double-layer capacitor current collector, for which the following proposals have been made until now.

Japanese Patent Laying-Open No. 2008-060124 (PTD 9) discloses the following problems. Specifically, physical roughening cannot form projections and depressions enough to achieve a sufficient anchor effect of an electrode active material, so that the facility cost is increased by AC etching. Also specifically, although a large amount of Cu conventionally needs to be contained in the case of chemical etching, Cu may lower corrosion resistance, which leads to corrosion by an electrolytic solution inside an electric double layer capacitor. In order to address the above-described problems, PTD 9 proposes an aluminum foil for electric double layer capacitor current collector configured to have a composition containing, in the mass ratio, 50 ppm to 500 ppm of Ni and a remainder including 99% or more of aluminum and inevitable impurities.

CITATION LIST

Patent Literature

PTL 1: Japanese Patent Laying-Open No. 2008-078330
PTL 2: Japanese Patent Laying-Open No. 02-288217
PTL 3: Japanese Patent Laying-Open No. 2001-143972
PTL 4: Japanese Patent Laying-Open No. 03-104207
PTL 5: Japanese Patent Laying-Open No. 11-307400
PTL 6: Japanese Patent Laying-Open No. 2008-177199
PTL 7: Japanese Patent Laying-Open No. 2008-177200
PTL 8: Japanese Patent Laying-Open No. 61-278124
PTL 9: Japanese Patent Laying-Open No. 2008-060124

SUMMARY OF INVENTION

Technical Problem

PTD 1 aims to improve the impregnation performance at the position 20 μm deep from the surface. Specifically, a prescribed number of microscopic pits significantly contributing to the capacitance are formed at the position 20 μm deep from the surface.

However, PTD 1 fails to mention the impregnation performance to the position of 20 μm deep from the surface. PTD 1 discloses that pits are coupled to each other near the surface to thereby form a pit having a uselessly large diameter, but fails to mention the specific size of the uselessly large pit diameter. Thus, it is unclear whether or not the impregnation performance is ensured from the surface to the depth at which microscopic pits significantly contributing to the capacitance are formed.

PTD 2 is based on the findings found by the inventors of PTD 2 conducting experiments, and specifically, based on the findings that a conductive polymer film can be formed by chemical oxidation polymerization from the surface to a depth of an average of 16 μm. In this PTD 2, the figures show only a tunnel-shaped pit since the capacitance appearance ratio is less relevant to the pit shape. However, as described above, since the pit shape also contributes to the capacitance of the electrolytic capacitor, the pit shape needs to be taken into consideration in order to achieve a high capacitance appearance ratio.

PTD 3 discloses a roughened layer obtained by a combination of cavities having different opening diameters in order to enlarge the surface area of an electrode member. Particularly referring to the figures, the cross-sectional shape of each cavity has an approximately circular shape.

Furthermore, each of PTD 4 and PTD 5 discloses that a pit is formed by AC etching inside a tunnel-shaped pit formed by DC etching in order to enlarge the surface area of an electrode member. In particular, PTD 4 discloses a suitable range of the opening diameter of a tunnel-shaped pit.

However, the impregnation performance of the solid electrolyte is not taken into consideration for the structures of the roughened layer and the etching layer disclosed in each of PTD 3 to PTD5.

PTD 1 to PTD 5 each relate to a foil-shaped or plate-shaped electrode member, and therefore, cannot provide a suitable electrode member based on the consideration of aspects such as a leakage current in a solid electrolytic capacitor, which may become a problem particularly in size reduction.

PTD 6 and PTD 7 each disclose that a linear-shaped valve action metal is etched as an electrode member.

PTD 6 and PTD 7 each fail to mention the capacitance appearance ratio. Also, PTD 6 and PTD 7 each fail to mention the specific processing method for etching performed for an aluminum wire and the specific structure of an etching layer.

PTD 8 illustrates four types of shapes including a circular shape, a semicircular shape, a track shape, and a quadrangular shape as examples of the cross-sectional shape of a linear-shaped valve action metal to be etched as an electrode member.

However, PTD 6 to PTD 8 each fail to disclose a specific structure of the etching layer, and therefore, fail to provide a suitable electrode member based on the consideration of aspects such as the capacitance appearance ratio and the capacitance. Also, in PTD 8, the influence caused by the difference of the cross-sectional shape of the linear-shaped valve action metal is not taken into consideration.

In PTD 9, only chemical etching is performed for an aluminum foil having a composition containing: 50 ppm to 500 ppm of Ni; and a remainder including 99% or more of aluminum and inevitable impurities. Also, PTD 9 fails to mention the specific structure of the etching layer formed by performing chemical etching.

The present invention has been made in light of the above-described problems. An object of the present invention is to provide: an electrolytic capacitor-specific electrode member allowing sufficient impregnation with an electrolyte to achieve a high capacitance appearance ratio when manufacturing an electrolytic capacitor; and an electrolytic capacitor including the electrolytic capacitor-specific electrode member.

Solution to Problem

An electrolytic capacitor-specific electrode member according to the present invention is provided as an electrolytic capacitor-specific electrode member included in an electrolytic capacitor. The electrolytic capacitor-specific electrode member has a wire shape. The electrolytic capacitor-specific electrode member has an outer surface including: at least one first cavity portion opened to outside; and at least one second cavity portion opened at least to the first cavity portion. The second cavity portion is smaller in opening diameter represented by a circle equivalent diameter than the first cavity portion.

The wire shape includes a linear shape, a rod shape, a wire shape, a fiber shape, a string shape, a belt shape, or an elongated pellet shape. It is preferable that the wire shape is formed to have a minor axis and a major axis in a view seen from the direction perpendicular to the axial direction of the electrolytic capacitor-specific electrode member, but may be formed in a shape such that the length in the longitudinal direction parallel to the axial direction is equal to the width in the width direction orthogonal to the longitudinal direction.

In the electrolytic capacitor-specific electrode member according to the present invention, the outer surface may further include a microscopic third cavity portion opened to the second cavity portion.

In the electrolytic capacitor-specific electrode member according to the present invention, preferably, a plurality of the first cavity portions include first cavity portions: each having an opening diameter represented by a circle equivalent diameter of 1 μm or more and 500 μm or less and/or a depth of 0.5 μm or more and 250 μm or less; and existing in a density of 1 piece/mm$^2$ or more and 2.0×10$^5$ pieces/mm$^2$ or less.

In the electrolytic capacitor-specific electrode member according to the present invention, preferably, the first cavity portion has a crater shape or a tunnel shape.

In the electrolytic capacitor-specific electrode member according to the present invention, preferably, in a macroscopic view of a cross-sectional shape of the electrolytic capacitor-specific electrode member that is perpendicular to an axial direction of the electrolytic capacitor-specific electrode member, the cross-sectional shape has a peripheral edge formed in an annular shape not having an angular portion.

A macroscopic view shows reduction ratios at which the opening plane in the cavity portion in the circumferential direction of the cross-sectional shape appears to be closed due to the state where one end and the other end of this opening plane appear to be connected to each other in the circumferential direction as a result of reducing the size of the cross-sectional shape of the electrolytic capacitor-specific electrode member that is perpendicular to the axial direction, and preferably shows the maximum reduction ratio among these reduction ratios.

In the electrolytic capacitor-specific electrode member according to the present invention, preferably, the electrolytic capacitor-specific electrode member is formed of an aluminum material containing 5 ppm or more and 150 ppm or less of Ni.

An electrolytic capacitor according to the present invention includes: the electrolytic capacitor-specific electrode member; a counter electrode member disposed to face the electrolytic capacitor-specific electrode member; and an electrolyte disposed between the electrolytic capacitor-specific electrode member and the counter electrode member.

In the electrolytic capacitor according to the present invention, preferably, the electrolyte is a solid electrolyte containing a conductive polymer.

Advantageous Effects of Invention

It becomes possible to provide: an electrolytic capacitor-specific electrode member allowing sufficient impregnation with an electrolyte to achieve a high capacitance appearance ratio when manufacturing an electrolytic capacitor; and an electrolytic capacitor including the electrolytic capacitor-specific electrode member.

DESCRIPTION OF EMBODIMENTS

Figure 1:
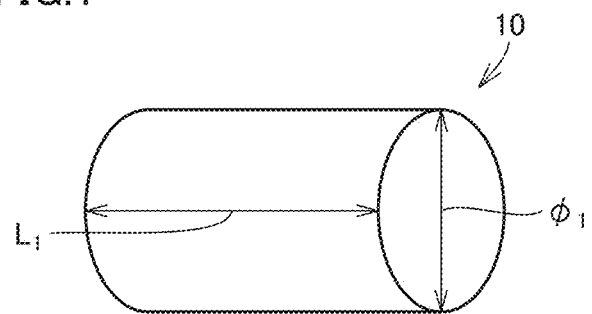
FIG. 1 is a perspective view schematically showing the first example of a base material as a precursor of an electrolytic capacitor-specific electrode member in the present invention.

The following description about embodiments for implementing the present invention is merely made for one embodiment of the present invention, and the present invention is not limited to these embodiments but can be appropriately modified and implemented so as not to deviate from the range of the gist.

In the embodiments described below, the same or corresponding components are designated by the same reference characters, and description thereof will not be repeated.

1. Base Material

A base material 10 as described below is a precursor of an electrolytic capacitor-specific electrode member 20 (see FIG. 6 and the like) as will be described later.

Base material 10 is etched to form a porous portion 22 (described later) on the outer surface side of base material 10, so that electrolytic capacitor-specific electrode member 20 can be manufactured. In this case, base material 10 includes both a core portion 21 and a porous portion 22 (described later) included in electrolytic capacitor-specific electrode member 20.

Furthermore, also by forming porous portion 22 around base material 10 by vapor deposition, powder adhesion and the like, electrolytic capacitor-specific electrode member 20 can be manufactured. In this case, base material 10 forms core portion 21.

Figure 2:
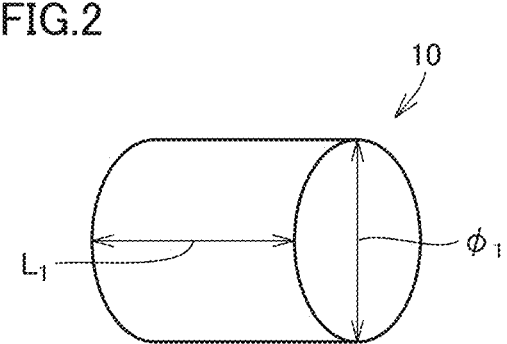
FIG. 2 is a perspective view schematically showing the second example of the base material as a precursor of the electrolytic capacitor-specific electrode member in the present invention.
Figure 3:
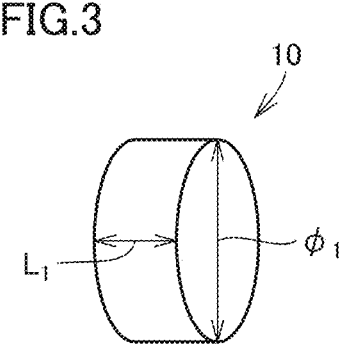
FIG. 3 is a perspective view schematically showing the third example of the base material as a precursor of the electrolytic capacitor-specific electrode member in the present invention.

FIG. 1 is a perspective view showing the first example of a base material as a precursor of an electrolytic capacitor-specific electrode member in the present invention. FIG. 2 is a perspective view schematically showing the second example of the base material as a precursor of the electrolytic capacitor-specific electrode member in the present invention. FIG. 3 is a perspective view schematically showing the third example of the base material as a precursor of the electrolytic capacitor-specific electrode member in the present invention. Referring to FIGS. 1 to 3, the shape of the base material as a precursor of the electrolytic capacitor-specific electrode member in the present invention will be described below.

Base material 10 may be formed in various shapes such as a linear shape, a rod shape, a wire shape, a fiber shape, a string shape, a belt shape, and an elongated pellet shape. Base material 10 extends in a prescribed direction and has an axial direction.

The relation between the length of base material 10 in its longitudinal direction (the axial direction) and the thickness of base material 10 in the thickness direction orthogonal to this longitudinal direction is not particularly limited.

As shown in FIGS. 1 to 3, base material 10 has an approximately cylindrical shape, for example. Also, the cross-sectional shape of base material 10 perpendicular to its axial direction has an approximately circular shape. As shown in FIG. 1, the relation between a diameter $\phi_1$ showing the thickness of base material 10 and a length $L_1$ may be $\phi_1 < L_1$. In this case, base material 10 has an elongated shape. Further, as shown in FIG. 2, the relation between diameter $\phi_1$ showing the thickness of base material 10 and length $L_1$ may be $\phi_1 = L_1$. Further, as shown in FIG. 3, the relation between diameter $\phi_1$ showing the thickness of base material 10 and length $L_1$ may be $\phi_1 > L_1$. In this case, base material 10 has a shape like a flat coin. It is preferable that base material 10 satisfies the relation of $\phi_1 < L_1$. In this case, also in electrolytic capacitor-specific electrode member 20, the relation between a diameter $\phi_2$ showing the thickness of the electrolytic capacitor-specific electrode member and a length $L_2$ of the electrolytic capacitor-specific electrode readily satisfies the relation of $\phi_2<L_2$. Thus, when the electrolytic capacitor is manufactured, the proportion of the surface area to the cross-sectional area is increased, so that a capacitance can be readily achieved. Furthermore, a leakage current can also be further reduced.

The cross-sectional shape of base material 10 perpendicular to its axial direction is not limited to a circular shape. The cross-sectional shape of base material 10 may be an oval shape such as an elliptical shape, an oblong circular shape, a track shape, and an egg shape, or may be a peanut shape.

Furthermore, it is preferable that the peripheral edge of the cross-sectional shape of base material 10 that is perpendicular to its axial direction has an annular shape not having an angular portion. This annular shape includes a polygonal shape having roundish corner portions, the above-mentioned oval shape, the above-mentioned peanut shape, and the like.

As the peripheral edge of the cross-sectional shape of base material 10 that is perpendicular to the axial direction has the above-described shape, a solid electrolyte is formed so as to extend along the surface of electrolytic capacitor-specific electrode member 20 when an electrolytic capacitor is manufactured, as described later. Thereby, the adhesiveness between electrolytic capacitor-specific electrode member 20 and the solid electrolyte is ensured, so that a high capacitance appearance ratio can be achieved.

Figure 4:
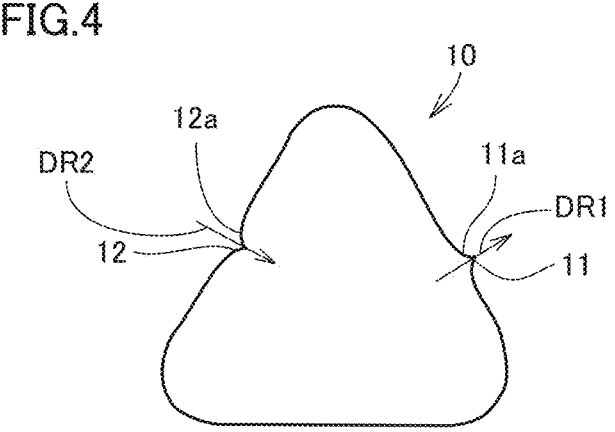
FIG. 4 is a diagram showing an example of a cross-sectional shape obtained when the base material as a precursor of the electrolytic capacitor-specific electrode member in the present invention is cut perpendicular to its longitudinal direction.

FIG. 4 is a diagram showing an example of a cross-sectional shape obtained when the base material as a precursor of the electrolytic capacitor-specific electrode member in the present invention is cut perpendicular to its longitudinal direction. Referring to FIG. 4, an example of the cross-sectional shape of base material 10 will be hereinafter described.

As shown in FIG. 4, the cross-sectional shape of base material 10 that is perpendicular to the axial direction has an approximately triangular shape having roundish corner portions, for example. Furthermore, base material 10 has a protrusion 11 that protrudes outward and a recess 12 that is recessed inward.

On its base portion, protrusion 11 has a curved portion 11a that curves so as to extend along a protruding direction DR1 toward the leading end. Curved portion 11a has a curved shape that curves so as to be recessed inside.

On its opening edge side, recess 12 has a curved portion 12a that curves so as to extend along a recess direction DR2 toward the bottom. Curved portion 12a has a curved shape that curves so as to protrude to the outside.

As described above, despite the existence of protrusion 11 and recess 12, such protrusion 11 and recess 12 have curved portion 11a and curved portion 12a, respectively, as described above, so that the adhesiveness of the solid electrolyte with the protrusion and the recess in electrolytic capacitor-specific electrode member 20 can be ensured when an electrolytic capacitor is manufactured. Thereby, also when base material 10 has protrusion 11 and recess 12, a high capacitance appearance ratio can be achieved.

The cross-sectional shape of base material 10 taken along the direction perpendicular to its longitudinal direction does not necessarily have to be uniform in the longitudinal direction.

Figure 5:
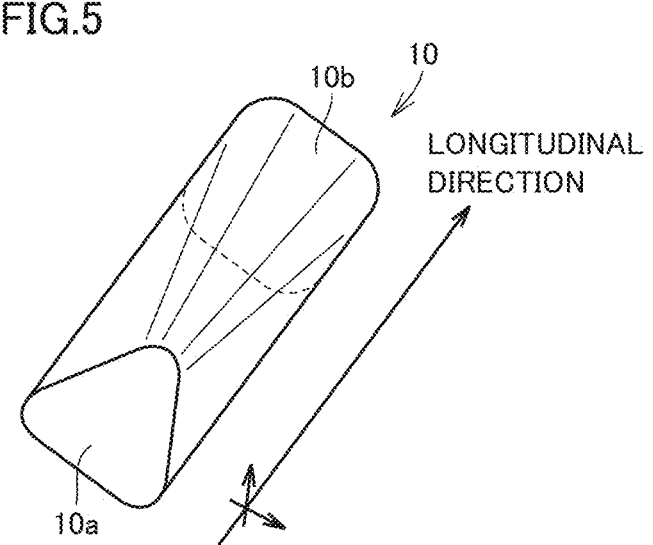
FIG. 5 is a diagram schematically showing the fourth example of the base material as a precursor of the electrolytic capacitor-specific electrode member in the present invention.

FIG. 5 is a diagram schematically showing the fourth example of the base material as a precursor of the electrolytic capacitor-specific electrode member in the present invention. Referring to FIG. 5, another shape of base material 10 will be hereinafter described.

As shown in FIG. 5, base material 10 has: an end portion 10a located on one side in the longitudinal direction and formed in an approximately triangular shape having roundish corner portions; and an end portion 10b located on the other side in the longitudinal direction and formed in an approximately quadrangular shape having roundish corner portions.

In this way, in base material 10, the shape of end portion 10a on one side in the longitudinal direction may be different from the shape of end portion 10b on the other side in the longitudinal direction. Also in this case, it is preferable that the above-described cross-sectional shape at an arbitrary position along the longitudinal direction has an annular shape not having an angular portion.

Furthermore, end portion 10a on one side in the longitudinal direction and end portion 10b on the other side in the longitudinal direction are not necessarily limited to a planar shape, but may be formed in a curved surface shape or formed by a point. For example, base material 10 may entirely have an ellipsoidal shape like a rugby ball formed to have a quadric surface.

Furthermore, as described later, when base material 10 is etched to manufacture electrolytic capacitor-specific electrode member 20, it is preferable that the shape of base material 10 is approximately the same as the shape of electrolytic capacitor-specific electrode member 20 for the purpose of simplifying the process of manufacturing an electrolytic capacitor. The shapes of base material 10 and electrolytic capacitor-specific electrode member 20 in this case mean the shapes as seen in a macroscopic view. Specifically, the shape of electrolytic capacitor-specific electrode member 20 corresponds to the shape in a view observed in a scale at which the cavity portions provided on its outer surface are not visible.

The purity and the impurities of base material 10 that are identical to those of the base material used for the conventional electrolytic capacitor-specific electrode member may be employed also in the present invention.

When electrolytic capacitor-specific electrode member 20 is manufactured using base material 10, first cavity portions 7a and 7b (see FIGS. 6, 7 and the like) and second cavity portions 8a, 8b, 8c (see FIGS. 6, 8, 10, and the like) (described later) are first formed, on which a dielectric 2 is then formed. In this case, it is preferable that dielectric 2 is made of an oxide containing a metal component derived from base material 10 in terms of adhesiveness between base material 10 and dielectric 2, or the like. Thus, the present invention preferably employs the base material made of a valve action metal such as aluminum, niobium and tantalum. The base material is more preferably made of an aluminum material containing 5 ppm to 150 ppm of Ni, and further more preferably made of an aluminum material containing 20 ppm to 100 ppm of Ni.

As described later, when a cavity portion is formed by etching, Ni is added to the aluminum material to thereby facilitate dissolution of aluminum, so that a large cavity portion can be readily formed in the surface layer of electrolytic capacitor-specific electrode member 20. The Ni content of 5 ppm to 150 ppm, specifically 20 ppm to 100 ppm, is particularly suitable for forming a crater-shaped first cavity portion as described later.

The above description does not imply that the aluminum material containing 5 ppm to 150 ppm of Ni is not suitable for the base material used for forming a tunnel-shaped cavity portion (described later) as the first cavity portion, but merely implies that formation of a crater-shaped first cavity portion can facilitate a further effect of adding Ni.

2. Electrolytic Capacitor-Specific Electrode Member (1) Shape of Electrolytic Capacitor-Specific Electrode Member FIGS. 6 to 10 each show an enlarged view schematically showing a cross-sectional shape in the vicinity of a surface layer obtained when an electrolytic capacitor-specific electrode member according to each of one embodiment, the first modification, the second modification, the third modification, and the fourth modification, respectively, of the present invention is cut perpendicular to its longitudinal direction (the axial direction).

As shown in FIGS. 6 to 10, electrolytic capacitor-specific electrode member 20 includes a core portion 21 and a porous portion 22 that is located around core portion 21. When base material 10 is etched to manufacture electrolytic capacitor-specific electrode member 20, porous portion 22 is formed of a roughened surface of base material 10.

The outer surface of electrolytic capacitor-specific electrode member 20 includes: at least one or more first cavity portions opened to outside; and at least one or more second cavity portions opened at least to the first cavity portion. The details of the cavity portions will be described later.

As described above, when electrolytic capacitor-specific electrode member 20 is manufactured by etching base material 10, electrolytic capacitor-specific electrode member 20 is approximately identical in shape to base material 10 in a macroscopic view. In this case, a macroscopic view shows the shape observed in a scale at which the cavity portions provided in the outer surface of electrolytic capacitor-specific electrode member 20 are not visible.

Specifically, electrolytic capacitor-specific electrode member 20 is formed in various shapes such as a linear shape, a rod shape, a wire shape, a fiber shape, a string shape, a belt shape, or an elongated pellet shape, as with base material 10. Furthermore, as described later, electrolytic capacitor-specific electrode member 20 may also be obtained by cutting base material 10 along the direction perpendicular to the axial direction, and also may have a shape obtained by cutting each of the above-described various shapes. The above-described various shapes and the shapes obtained by cutting the above-described various shapes will be hereinafter collectively referred to as a wire shape. Electrolytic capacitor-specific electrode member 20 has such a wire shape.

In a view seen from the direction orthogonal to the axial direction of base material 10, the wire shape preferably has a minor axis and a major axis, but may also be formed in a shape such that the length in the longitudinal direction parallel to the axial direction is equal to the width in the width direction orthogonal to the longitudinal direction.

The relation between the length of electrolytic capacitor-specific electrode member 20 in the longitudinal direction (the axial direction) and the thickness of electrolytic capacitor-specific electrode member 20 in the thickness direction orthogonal to the longitudinal direction is not particularly limited as in the case of base material 10.

In a macroscopic view, electrolytic capacitor-specific electrode member 20 may have an approximately cylindrical shape, for example. In this case, the cross-sectional shape of electrolytic capacitor-specific electrode member 20 that is perpendicular to the axial direction is a circular shape. In this case, the relation between a diameter $\phi_2$ showing the thickness of electrolytic capacitor-specific electrode member 20 and a length $L_2$ may be $\phi_2 < L_2$, may be $\phi_2 = L_2$, or may be $\phi_2 > L_2$, as in the case of base material 10.

The cross-sectional shape of electrolytic capacitor-specific electrode member 20 perpendicular to the axial direction is not limited to a circular shape. The cross-sectional shape of electrolytic capacitor-specific electrode member 20 may have an oval shape such as an elliptical shape, an oblong circular shape, a track shape, and an egg shape, or may be a peanut shape.

It is preferable that the peripheral edge of the cross-sectional shape of electrolytic capacitor-specific electrode member 20 perpendicular to the axial direction has an annular shape not having an angular portion in a macroscopic view. This annular shape includes a polygonal shape having roundish corner portions, the above-mentioned oval shape, the above-mentioned peanut shape, and the like.

Assuming that an electrolytic capacitor is manufactured using electrolytic capacitor-specific electrode member 20 configured such that its cross-sectional shape perpendicular to the axial direction has an angled (for example, right-angled) and non-roundish corner, when a solid electrolyte such as a conductive polymer is used as an electrolyte, there is only a small area in which the solid electrolyte can come into contact with such an angled (for example, right-angled) and non-roundish corner of electrolytic capacitor-specific electrode member 20.

Accordingly, the adhesiveness between the solid electrolyte and electrolytic capacitor-specific electrode member 20 is poor at the above-mentioned angled (for example, right-angled) and non-roundish corner of electrolytic capacitor-specific electrode member 20. Thus, the solid electrolyte may peel off from electrolytic capacitor-specific electrode member 20. In addition, the solid electrolyte cannot be polymerized at the angled (for example, right-angled) and non-roundish corner of electrolytic capacitor-specific electrode member 20. Thereby, the capacitance appearance ratio may be decreased.

As in the present embodiment, the peripheral edge of the cross-sectional shape of electrolytic capacitor-specific electrode member 20 that is perpendicular to the axial direction has an annular shape not having an angular portion in a macroscopic view, so that a solid electrolyte is formed so as to extend along the surface of electrolytic capacitor-specific electrode member 20. Thereby, the adhesiveness between electrolytic capacitor-specific electrode member 20 and the solid electrolyte is ensured, so that a high capacitance appearance ratio can be achieved.

When base material 10 has protrusion 11 and/or recess 12 as described above, electrolytic capacitor-specific electrode member 20 is also to have a protrusion and/or a recess. When electrolytic capacitor-specific electrode member 20 has a protrusion, as in base material 10, the protrusion has a curved portion on its base portion so as to curve along the protruding direction toward the leading end, so that the adhesiveness between the protrusion and the solid electrolyte can be ensured. Furthermore, when electrolytic capacitor-specific electrode member 20 has a recess, as in base material 10, the recess has a curved portion so as to curve along the recess direction toward the bottom, so that the adhesiveness between the recess and the solid electrolyte can be ensured. Thereby, also when electrolytic capacitor-specific electrode member 20 has a protrusion and/or a recess, a high capacitance appearance ratio can be achieved.

Furthermore, the shape of the electrolytic capacitor-specific electrode member in the present invention may also be different from the shape of the base material. For example, even when the base material has an elongated shape such that $\phi_1 < L_1$ as shown in FIG. 1, the base material is cut when manufacturing an electrolytic capacitor, to be formed in a flat coin shape such that the relation between diameter $\phi_2$ showing the thickness of the electrolytic capacitor-specific electrode member and length $L_2$ of the electrolytic capacitor-specific electrode is $\phi_2 > L_2$ as shown in FIG. 3, which may also be included in the electrolytic capacitor-specific electrode member in the present invention. It is preferable that the electrolytic capacitor-specific electrode member satisfies the relation of $\phi_2 < L_2$. In this case, the proportion of the surface area to the cross-sectional area is increased, so that the capacitance can be readily achieved. Furthermore, a leakage current can also be further reduced.

When base material 10 is etched to manufacture electrolytic capacitor-specific electrode member 20, dissolution of aluminum is facilitated by adding Ni to an aluminum material. Accordingly, a large cavity portion can be readily formed in the surface layer of electrolytic capacitor-specific electrode member 20. Thus, it is preferable that electrolytic capacitor-specific electrode member 20 also contains Ni. Also, electrolytic capacitor-specific electrode member 20 suitably contains 5 ppm to 150 ppm of Ni, and particularly suitably contains 20 ppm to 100 ppm. In other words, electrolytic capacitor-specific electrode member 20 is formed of an aluminum material preferably containing 5 ppm or more and 150 ppm or less of Ni, and further preferably containing 20 ppm or more and 100 ppm or less of Ni.

(2) Entire Structure of Cavity Portion

Electrolytic capacitor-specific electrode member 20 in the present invention has an outer surface including: at least one or more first cavity portions; and at least one or more second cavity portions opened at least to the first cavity portions. Also, electrolytic capacitor-specific electrode member 20 is formed using a wire-shaped base material. The first cavity portion is opened to the outside of electrolytic capacitor-specific electrode member 20 and larger than the cavity portion formed at a depth from the surface layer (for example, on the core side) of electrolytic capacitor-specific electrode member 20. Furthermore, electrolytic capacitor-specific electrode member 20 in the present invention includes a third cavity portion that is microscopically smaller than the second cavity portion. One example of the above structure will be described below with reference to FIGS. 6 to 10.

Figure 6:
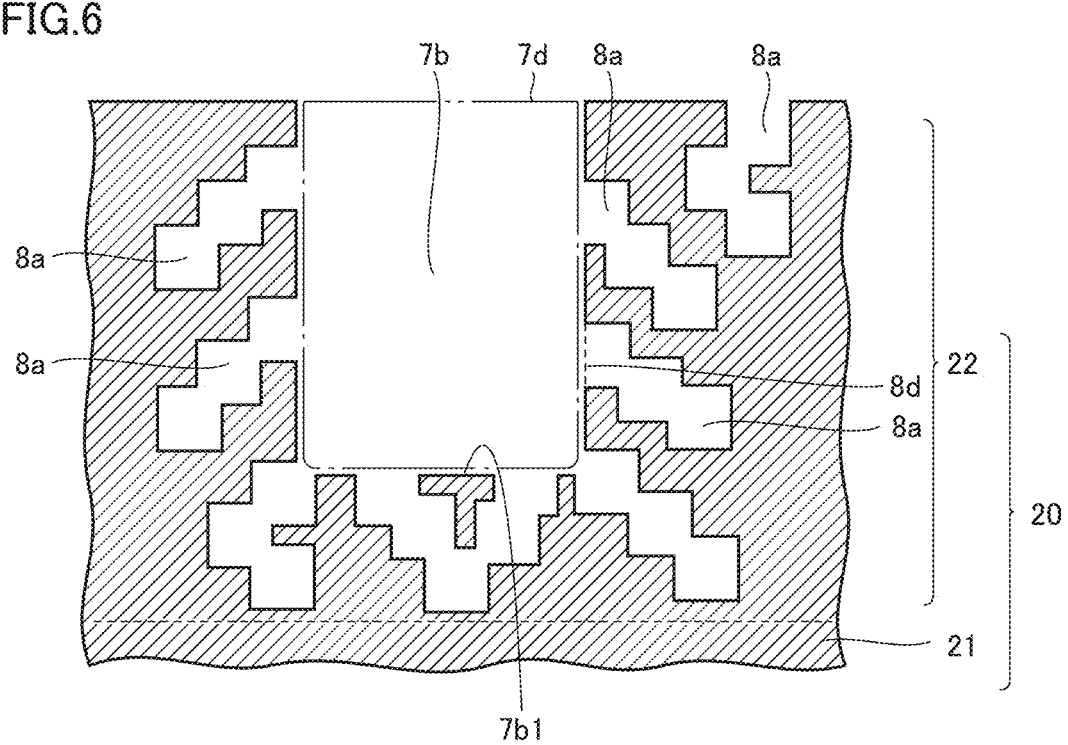
FIG. 6 is an enlarged view schematically showing a cross-sectional shape in the vicinity of a surface layer obtained when an electrolytic capacitor-specific electrode member according to one embodiment of the present invention is cut perpendicular to its longitudinal direction (the axial direction).

FIG. 6 is an enlarged view schematically showing a cross-sectional shape in the vicinity of a surface layer obtained when an electrolytic capacitor-specific electrode member according to one embodiment of the present invention is cut perpendicular to its longitudinal direction.

As shown in FIG. 6, in an electrode member in one embodiment, the outer surface of electrolytic capacitor-specific electrode member 20 includes a first cavity portion 7b and a second cavity portion 8a.

First cavity portion 7b is opened to the outside of electrolytic capacitor-specific electrode member 20, and has an opening plane 7d. First cavity portion 7b has a tunnel shape. In first cavity portion 7b, the depth from opening plane 7d to a bottom portion 7b1 of first cavity portion 7b is longer than the largest opening diameter of opening plane 7d.

First cavity portion 7b extends toward the axial center. Specifically, first cavity portion 7b extends along the direction perpendicular to the axial direction, for example. The extending direction of first cavity portion 7b is not limited to the direction perpendicular to the axial direction, but may extend in any direction that establishes a twisting relation with the axial direction.

Second cavity portion 8a is mainly opened to first cavity portion 7b and has an opening plane 8d. Some of second cavity portions 8a are opened to the outside of electrolytic capacitor-specific electrode member 20. The opening diameter of second cavity portion 8a represented by a circle equivalent diameter is smaller than the opening diameter of first cavity portion 7b represented by a circle equivalent diameter.

Second cavity portion 8a has an approximately cubic shape. The shape of second cavity portion 8a is not limited to an approximately cubic shape, but may be an approximately equilateral triangular pyramid shape, an approximately spherical shape and the like. In this case, the approximately cubic shape, the approximately equilateral triangular pyramid shape and the approximately spherical shape are not necessarily limited to the shapes satisfying the requirements for a cubic shape, an equilateral triangular pyramid shape, and a spherical shape, respectively, in a geometrical aspect, but may also be a shape having the ratio of width, height and depth that deviates from the above-mentioned requirements to some extent.

Figure 7:
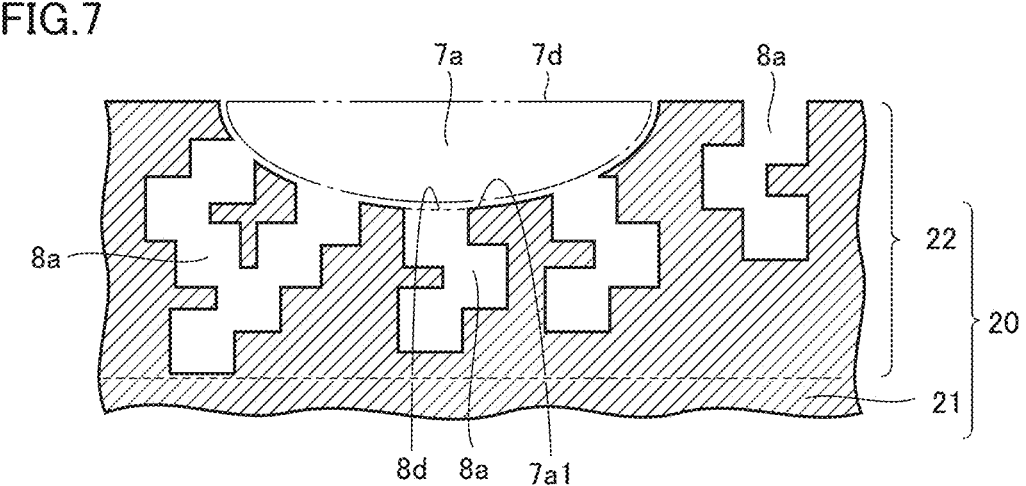
FIG. 7 is an enlarged view schematically showing a cross-sectional shape in the vicinity of a surface layer obtained when an electrolytic capacitor-specific electrode member according to the first modification of the present invention is cut perpendicular to its longitudinal direction (the axial direction).

FIG. 7 is an enlarged view schematically showing a cross-sectional shape in the vicinity of a surface layer obtained when an electrolytic capacitor-specific electrode member according to the first modification of the present invention is cut perpendicular to its longitudinal direction.

As shown in FIG. 7, as compared with electrolytic capacitor-specific electrode member 20 according to one embodiment shown in FIG. 6, an example of electrolytic capacitor-specific electrode member 20 in the first modification is different in shape of first cavity portion 7a among first cavity portion 7a and second cavity portion 8a that are included in the outer surface of electrolytic capacitor-specific electrode member 20. Other configurations are almost the same.

First cavity portion 7a has a crater shape. In first cavity portion 7a, the depth from opening plane 7d to a bottom portion 7a1 of first cavity portion 7a is shorter than the largest opening diameter of opening plane 7d.

Second cavity portion 8a is mainly opened to first cavity portion 7a and has an approximately cubic shape. Some of second cavity portions 8a are opened to the outside. The opening diameter of second cavity portion 8a represented by a circle equivalent diameter is smaller than the opening diameter of first cavity portion 7a represented by a circle equivalent diameter.

Figure 8:
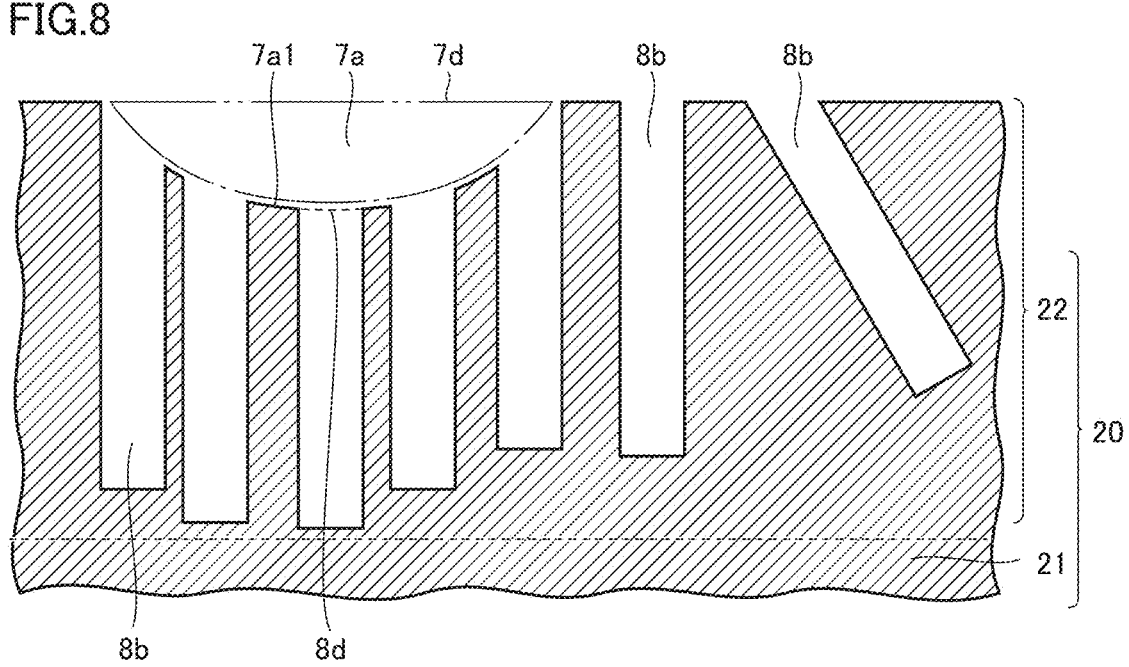
FIG. 8 is an enlarged view schematically showing a cross-sectional shape in the vicinity of a surface layer obtained when an electrolytic capacitor-specific electrode member according to the second modification of the present invention is cut perpendicular to its longitudinal direction (the axial direction).

FIG. 8 is an enlarged view schematically showing a cross-sectional shape in the vicinity of a surface layer obtained when an electrolytic capacitor-specific electrode member according to the second modification of the present invention is cut perpendicular to its longitudinal direction.

As shown in FIG. 8, an example of electrolytic capacitor-specific electrode member 20 in the second modification is different in shape of each of first cavity portion 7a and second cavity portion 8b included in the outer surface of electrolytic capacitor-specific electrode member 20, as compared with electrolytic capacitor-specific electrode member 20 according to one embodiment shown in FIG. 6.

First cavity portion 7a has a crater shape. In first cavity portion 7a, the depth from opening plane 7d to a bottom portion 7a1 of first cavity portion 7a is shorter than the largest opening diameter of opening plane 7d.

Second cavity portion 8b is mainly opened to first cavity portion 7a and has an approximately tunnel shape. Some of second cavity portions 8b are opened to the outside. In second cavity portion 8b, the depth from opening plane 8d to a bottom portion 8b1 of second cavity portion 8b is longer than the largest opening diameter of opening plane 8d. The opening diameter of second cavity portion 8b represented by a circle equivalent diameter is smaller than the opening diameter of first cavity portion 7a represented by a circle equivalent diameter.

Figure 9:
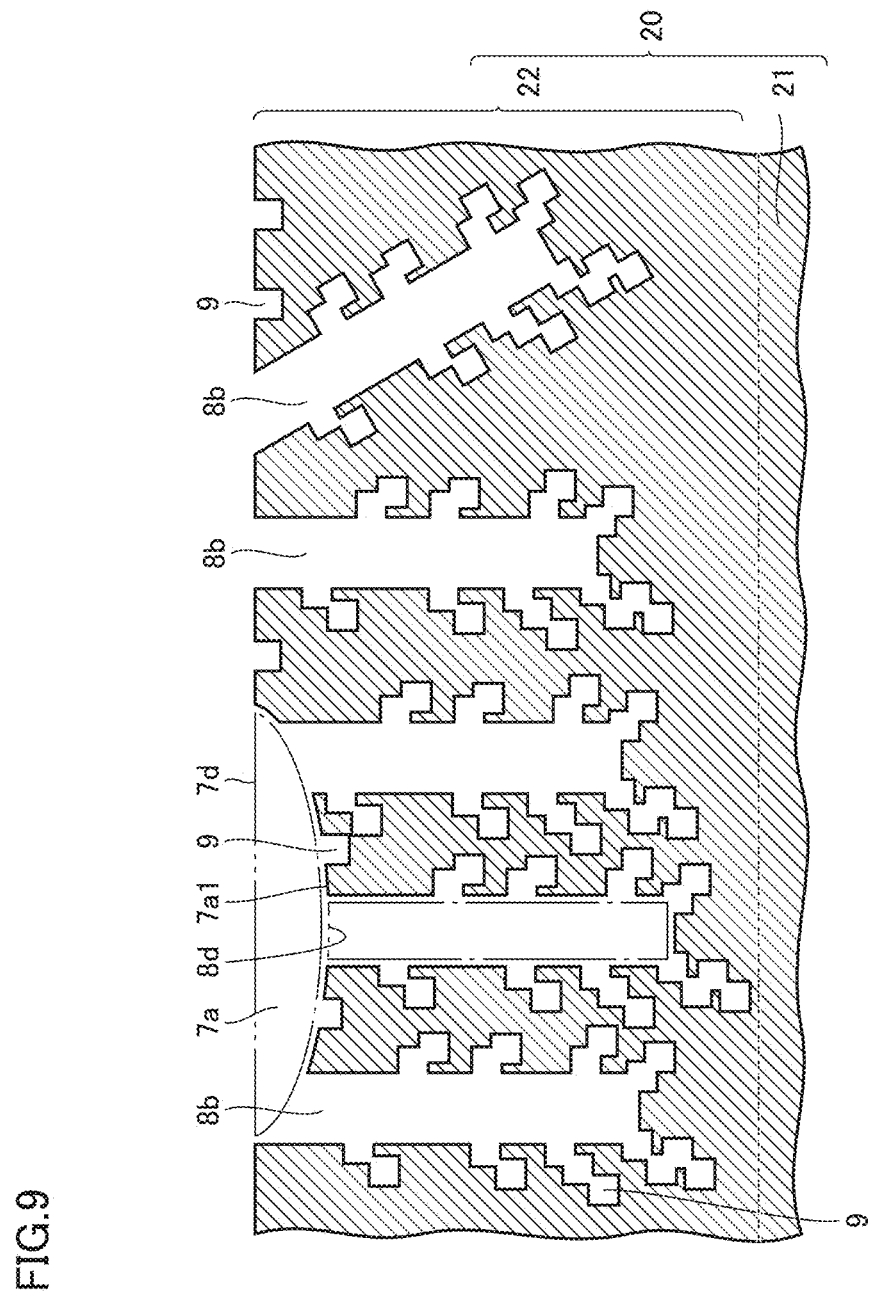
FIG. 9 is an enlarged view schematically showing a cross-sectional shape in the vicinity of a surface layer obtained when an electrolytic capacitor-specific electrode member according to the third modification of the present invention is cut perpendicular to its longitudinal direction (the axial direction).

FIG. 9 is an enlarged view schematically showing a cross-sectional shape in the vicinity of a surface layer obtained when an electrolytic capacitor-specific electrode member according to the third modification of the present invention is cut perpendicular to its longitudinal direction.

As shown in FIG. 9, an example of electrolytic capacitor-specific electrode member 20 in the third modification is different in that the outer surface of base material 10 further includes a third cavity portion 9, as compared with electrolytic capacitor-specific electrode member 20 in the second modification shown in FIG. 8.

Third cavity portion 9 is mainly opened to second cavity portion 8b and has an approximately cubic shape. The shape of third cavity portion 9 is not limited to an approximately cubic shape, but may be an approximately equilateral triangular pyramid shape, an approximately spherical shape, and the like. Third cavity portion 9 is formed to be microscopically smaller than second cavity portion 8b. The opening diameter of third cavity portion 9 represented by a circle equivalent diameter is smaller than the opening diameter of second cavity portion 8b represented by a circle equivalent diameter.

Figure 10:
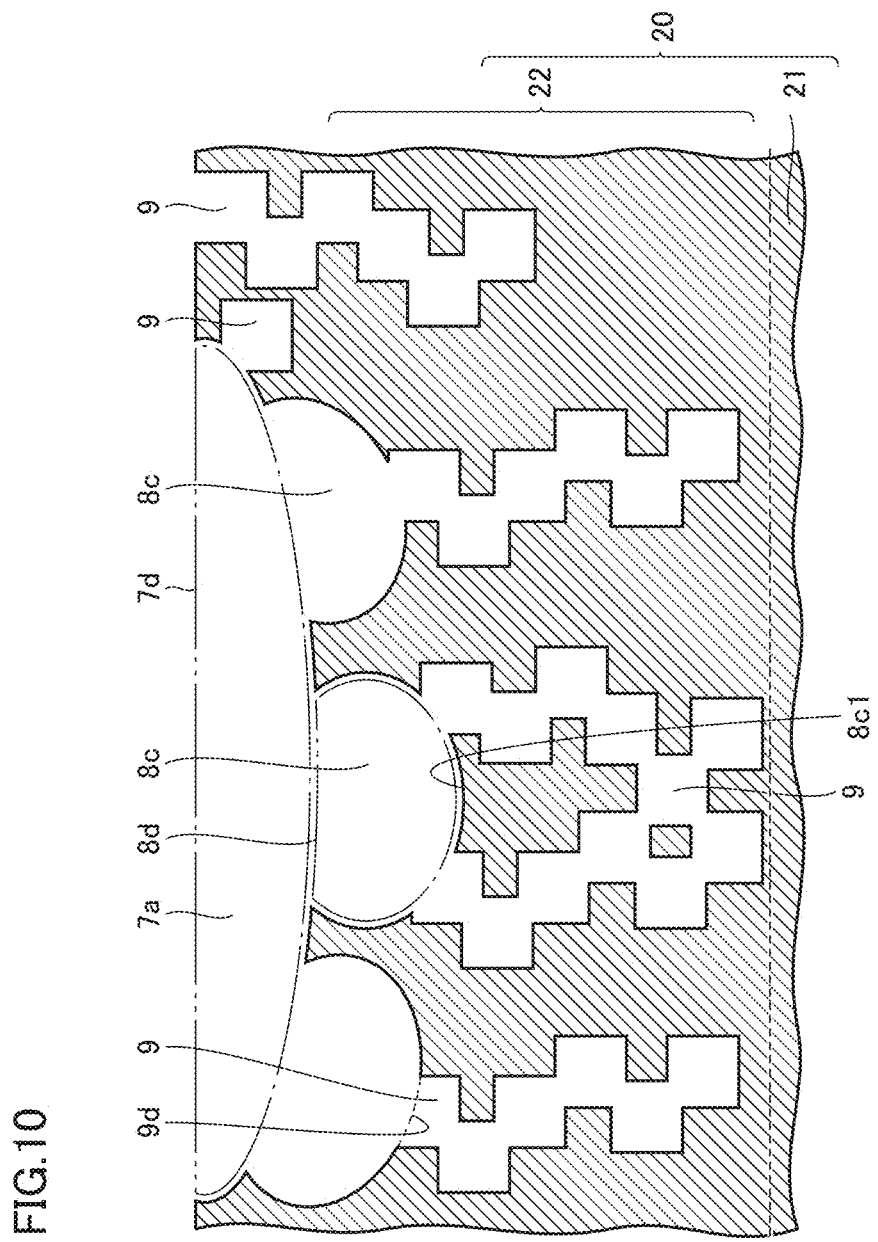
FIG. 10 is an enlarged view schematically showing a cross-sectional shape in the vicinity of a surface layer obtained when an electrolytic capacitor-specific electrode member according to the fourth modification of the present invention is cut perpendicular to its longitudinal direction (the axial direction).

FIG. 10 is an enlarged view schematically showing a cross-sectional shape in the vicinity of a surface layer obtained when an electrolytic capacitor-specific electrode member according to the fourth modification of the present invention is cut perpendicular to its longitudinal direction.

As shown in FIG. 10, electrolytic capacitor-specific electrode member 20 according to the fourth modification is mainly different in the shape of a second cavity portion 8c, as compared with electrolytic capacitor-specific electrode member 20 in the third modification.

First cavity portion 7a has a crater shape. First cavity portion 7a is larger in opening diameter of a circle equivalent diameter than first cavity portion 7a in the third modification.

Second cavity portion 8c is mainly opened to first cavity portion 7a and has an approximately crater shape. Some of second cavity portions 8c may be opened to the outside. In second cavity portion 8c, the depth from opening plane 8d to a bottom portion 8c1 of second cavity portion 8c is shorter than the largest opening diameter of opening plane 8d.

Third cavity portion 9 is mainly opened to second cavity portion 8c and has an approximately cubic shape. Some of third cavity portions 9 are opened to the outside. Third cavity portion 9 is formed microscopically smaller than second cavity portions 8b. The opening diameter of third cavity portion 9 represented by a circle equivalent diameter is smaller than the opening diameter of second cavity portion 8b represented by a circle equivalent diameter.

In consideration of the fact that the thickness of the dielectric formed on the surface of electrolytic capacitor-specific electrode member 20 varies according to the working voltage of the electrolytic capacitor, an electrolytic capacitor-specific electrode member 20 suitable to a relatively low working voltage may be: (i) electrolytic capacitor-specific electrode member 20 according to one embodiment and electrolytic capacitor-specific electrode member 20 according to the first modification that have the second cavity portions formed in an approximately cubic shape and an approximately spherical shape as shown in FIG. 6 and FIG. 7, respectively; and (ii) electrolytic capacitor-specific electrode member 20 according to the third modification and electrolytic capacitor-specific electrode member 20 according to the fourth modification that have the third cavity portions as shown in FIG. 9 and FIG. 10, respectively.

On the other hand, as shown in FIG. 8, electrolytic capacitor-specific electrode member 20 according to the second modification having the second cavity portion formed in a tunnel shape but not having the third cavity portion formed in an approximately cubic shape or an approximately spherical shape is rather suitable to a relatively high working voltage.

(3) First Cavity Portion

Since the second cavity portion is microscopically smaller than the first cavity portion, the second cavity portion greatly contributes to enlargement of the surface area of electrolytic capacitor-specific electrode member 20. In this case, the second cavity portion has an approximately cubic shape. Thus, when these second cavity portions are in communication with each other while being displaced in a prescribed direction, there is a partially narrow portion in the communication direction.

Accordingly, in the case where a solid electrolyte such as a conductive polymer is used for an electrolyte, when the communication portion between a plurality of microscopic (for example, having an opening diameter less than 1 µm) cavity portions and a microscopic cavity portion opened to the outside is impregnated with an electrolyte, a microscopic cavity portion located at a certain depth from the surface layer is blocked by the electrolyte. Thus, the microscopic cavity portion deeper than this blocked cavity portion is not impregnated with the electrolyte. In this case, the capacitance appearance ratio is decreased.

Then, as in the present invention, by providing the first cavity portion opened to the outside and larger in opening diameter than the second cavity portion, and by providing the second cavity portion opened to the first cavity portion, the impregnation performance in the vicinity of the surface layer of electrolytic capacitor-specific electrode member 20 can be ensured by the amount corresponding to the depth of the first cavity portion. Furthermore, the electrolyte with which the first cavity portion is impregnated infiltrates into the second cavity portion opened to the first cavity portion, to sufficiently fill the second cavity portion. Consequently, a high capacitance appearance ratio can be achieved.

It is preferable that the first cavity portions each having an opening diameter of 1 µm to 500 µm and/or a depth of 0.5 µm to 250 µm exist in a density of 1 piece/mm$^2$ to $2.0 \times 10^5$ pieces/mm$^2$.

When a solid electrolyte such as a conductive polymer is used as an electrolyte, the first cavity portion is formed to have an opening diameter of 1 µm or more and further preferably 3 µm or more in consideration of the particle size of the solid electrolyte, so that the first cavity portion can be filled with an electrolyte. Accordingly, the second cavity portion opened to the first cavity portion can be sufficiently filled with an electrolyte, Then, when each first cavity portion is formed to have an opening diameter of 500 µm or less and further preferably 20 µm or less, the second cavity portions can also be formed in an appropriate density.

Furthermore, by providing the second cavity portion so as to be opened to the first cavity portion, when a plurality of microscopic second cavity portions are formed without providing the first cavity portion, peeling off of the densely-provided second cavity portions from the surface layer of base material 10 can be suppressed. Consequently, the second cavity portions can be formed in an appropriate density.

Furthermore, the depth of the first cavity portion is preferably 0.5 μm to 250 μm. The depth of the first cavity portion is more preferably 1.5 μm to 10 μm.

As described above, in the portion where the second cavity portions are continuous to each other, the second cavity portions partially overlap with each other in many cases. Since the second cavity portion is microscopic, the portion where one second cavity portion is continuous to the adjacent second cavity portion is further microscopically smaller. Thus, when the first cavity portion is not provided but only a plurality of microscopic cavity portions (for example, having an opening diameter less than 1 μm) are provided to be opened to the outside and impregnated with an electrolyte, the electrolyte may block the portion where microscopic cavity portions are continuous to each other. Thereby, there is a tendency that the microscopic cavity portions located deeper than this blocked portion cannot be impregnated with an electrolyte.

Accordingly, by providing the second cavity portion to be opened to the first cavity portion larger than the second cavity portion, the impregnation performance of the electrolyte can be improved by the amount corresponding to the depth of the first cavity portion.

On the other hand, when the first cavity portion is formed too deep, it becomes difficult that microscopic cavity portions significantly contributing to enlargement of the surface area of electrolytic capacitor-specific electrode member 20 are formed in a sufficient density.

Accordingly, by forming the first cavity portion to have a depth of 0.5 μm to 250 μm, and more preferably 1.5 μm to 10 μm, the capacitance appearance ratio and the capacitance can also be improved.

Furthermore, by forming the first cavity portions in a density of 1 piece/mm$^2$ to $2.0 \times 10^5$ pieces/mm$^2$, further more preferably a density of $3 \times 10^2$ pieces/mm$^2$ to $150 \times 10^2$ pieces/mm$^2$, the second cavity portions contributing to enlargement of the surface area of electrolytic capacitor-specific electrode member 20 can be formed in an appropriate density. Consequently, peeling off of the densely-provided second cavity portions from the surface layer of base material 10 can be suppressed.

Furthermore, by providing the second cavity portion in each of the first cavity portions formed in the above-mentioned density, not only the inside of each first cavity portion but also each second cavity portion throughout electrolytic capacitor-specific electrode member 20 can be uniformly filled with an electrolyte.

Based on the above description, when the first cavity portions are formed to have the first opening diameter of 1 μm to 500 μm and formed in a density of 1 piece/mm$^2$ to $2.0 \times 10^5$ pieces/mm$^2$, the second cavity portion opened to the first cavity portion can be sufficiently filled with an electrolyte while the second cavity portion can be uniformly filled with an electrolyte throughout electrolytic capacitor-specific electrode member 20. Accordingly, when electrolytic capacitor-specific electrode member 20 is used, a higher capacitance appearance ratio can be achieved.

(4) Second Cavity Portion

As compared with the first cavity portion, the second cavity portion is microscopicalloy smaller and more greatly contribute to enlargement of the surface area of electrolytic capacitor-specific electrode member 20. Thus, when the second cavity portion formed in the inner wall of the first cavity portion particularly has an approximately cubic shape or an approximately spherical shape, the second cavity portion is further formed in the inner wall repeatedly to provide continuously arranged second cavity portions, thereby increasing the surface area of electrolytic capacitor-specific electrode member 20, so that a high capacitance can be achieved.

The second cavity portion is not necessarily formed in the inner wall of the first cavity portion, and also not necessarily continuous to the cavity portion formed in the inner wall of the first cavity portion. The second cavity portion may be opened to the outside of electrolytic capacitor-specific electrode member 20 and smaller than the first cavity portion, particularly may have an opening diameter less than 1 μm, and may be continuous to the cavity opened to the outside of electrolytic capacitor-specific electrode member 20 and smaller than the first cavity portion.

A solid electrolyte infiltrate into the cavity portion opened to the outside of electrolytic capacitor-specific electrode member 20 and the cavity portion formed in the vicinity of the surface layer of electrolytic capacitor-specific electrode member 20, thereby achieving an anchor effect, so that the adhesiveness between electrolytic capacitor-specific electrode member 20 and the solid electrolyte can be enhanced. As a result, it becomes possible to prevent the capacitance appearance ratio from decreasing due to removal of the solid electrolyte from electrolytic capacitor-specific electrode member 20.

Furthermore, the second cavity portions are continuously provided in piles in the direction opposite to the first cavity portion. Thereby, the surface area of electrolytic capacitor-specific electrode member 20 (more accurately, the surface area of the dielectric formed on electrolytic capacitor-specific electrode member 20 with which the electrolyte can come into contact) is increased, so that a high capacitance can be achieved.

Furthermore, as shown in FIG. 10, second cavity portion 8c may be formed in a crater shape larger than third cavity portion 9 but smaller than first cavity portion 7a. In other words, the second cavity portion in the present invention also includes cavity portions that are formed to be continuous to each other from the inner wall of the first cavity portion so as to be reduced in size toward the direction opposite to the first cavity portion.

It is to be noted that the expression "reduced in size" does not necessarily means only the case where the size is continuously reduced. The opening diameter equivalent to a circle diameter of the second cavity portion on the deepest side only has to be smaller than the opening diameter equivalent to a circle diameter of the second cavity portion in the portion opened to the first cavity portion, and also may be larger than the opening diameter equivalent to a circle diameter of the second cavity portion in the portion opened to the first cavity portion in the section from the first opening side to the deepest side.

In this way, the crater-shaped first cavity portion and the crater-shaped second cavity portions that contribute to the impregnation performance are structured to be continuous to each other, so that it becomes possible to achieve impregnation with an electrolyte to the deeper site. Furthermore, by providing second cavity portion 8c that is increased in diameter and then reduced in diameter from the opening side of the cavity portion to the deepest side as described above, the surface area of electrolytic capacitor-specific electrode member 20 can be increased as compared with the case where the second cavity portion is provided so as to extend in the depth direction in the state where the opening diameter is uniform.

Preferably, the opening diameter of the second cavity portion represented by a circle equivalent diameter is 50 nm to 1 μm.

Generally, when a solid electrolyte layer is formed using a solid electrolyte such as a conductive polymer as an electrolyte, chemical oxidation polymerization or electrolytic polymerization are conventionally performed. However, even by chemical oxidation polymerization or electrolytic polymerization, a polymerization solution directly reacts with electrolytic capacitor-specific electrode member 20 during polymerization. Thereby, chemical stress is applied to electrolytic capacitor-specific electrode member 20, with the result that sufficient characteristics cannot be achieved particularly in the region where a withstand voltage is relatively high.

Thus, in recent years, a solid electrolyte layer is formed also by the method of applying a dispersion solution and then drying the applied dispersion solution. When such a dispersion solution is used, no chemical stress is applied to electrolytic capacitor-specific electrode member 20. Accordingly, it is advantageous that sufficient characteristics can be achieved even at a high withstand voltage while the manufacturing process becomes simplified. However, in contrast to a polymerization solution, conductive polymers are merely dispersed in the dispersion solution, with the result that the particle size of the conductive polymer becomes a problem.

Thus, in order to effectively form a solid electrolyte layer by a method using a dispersion solution, it is preferable that the opening diameter of the second cavity portion is 50 nm or more as in the present embodiment in consideration of the particle size of the solid electrolyte.

On the other hand, the second cavity portion contributes to enlargement of the surface area of electrolytic capacitor-specific electrode member 20. Accordingly, when the opening diameter is set to be 1 μm or less and the upper limit is set for the gap portion in each second cavity portion, a larger number of second cavity portions can be formed accordingly.

(5) Third Cavity Portion

One example of electrolytic capacitor-specific electrode member 20 having the third cavity portion formed in an approximately cubic shape or an approximately spherical shape may be an electrolytic capacitor-specific electrode member 20 according to the third modification having the first cavity portion formed in a crater shape and the second cavity portion formed in a tunnel shape, for example, as shown in FIG. 9.

The microscopically smallest third cavity portion is formed in an approximately cubic shape or an approximately spherical shape. Thus, electrolytic capacitor-specific electrode member 20 in this case is suitable to a relatively low working voltage in the electrolytic capacitor, as already described above. In order to further increase the surface area of electrolytic capacitor-specific electrode member 20, the microscopic third cavity portions need to be continuous to each other in several piles. However, when a plurality of the third cavity portions are continuous to the third cavity portion opened to the outside, for example, an electrolyte blocks the portion where the third cavity portions are continuous to each other, as in the case of the second cavity portion having an approximately cubic shape or an approximately spherical shape. Thereby, there is a tendency that the third cavity portions located deeper than this blocked portion cannot be impregnated with an electrolyte.

On the other hand, when the first cavity portion has a crater shape formed too deep, microscopic cavity portions contributing to enlargement of the surface area cannot be formed accordingly.

Thus, the capacitance appearance ratio in the vicinity of the surface layer of electrolytic capacitor-specific electrode member 20 is improved by forming the first cavity portion having a crater shape. Also, the capacitance appearance ratio at a relatively deep position from the surface layer of electrolytic capacitor-specific electrode member 20 is improved by forming the second cavity portion having a tunnel shape. Then, the third cavity portion contributing to enlargement of the surface area of electrolytic capacitor-specific electrode member 20 is formed, thereby increasing the capacitance. The above-described effects can be achieved by forming three types of cavity portions such as the first cavity portion, the second cavity portion, and the third cavity portion.

As the fourth deformation, FIG. 10 shows electrolytic capacitor-specific electrode member 20 including first cavity portion 7a and second cavity portion 8c each having a crater shape, as described above. In this case, as in the third modification shown in FIG. 9, first cavity portion 7a and second cavity portion 8c rather significantly contribute to improvement in impregnation performance, whereas third cavity portion 9 contributes to enlargement of the surface area of electrolytic capacitor-specific electrode member 20.

(6) Method of Forming Cavity Portion

Examples of the method of forming a cavity portion such as the first cavity portion, the second cavity portion and the third cavity portion in electrolytic capacitor-specific electrode member 20 in the present invention may be (DC, AC, chemical, sputtering, plasma, and the like) etching, vapor deposition, and powder adhesion (including sintering after adhesion).

In the case of etching, the first cavity portion, the second cavity portion and the third cavity portion are formed in separate steps, for example, by etching selected in accordance with the shape of each cavity portion among from: (i) DC etching in an aqueous solution containing hydrochloric acid (for example, when the first cavity portion and the second cavity portion each having a tunnel shape are formed); (ii) AC etching (for example, the frequency is decreased when the first cavity portion and the second cavity portion each having a crater shape are formed while the frequency is increased when the second cavity portion and the third cavity portion each having a microscopic cubic or spherical shape are formed), or (iii) chemical etching (for example, when the first cavity portion is formed, masking is performed using a hole identical in size to the targeted first cavity portion as pre-treatment of chemical etching).

When AC etching is performed, the frequency is gradually increased. Specifically, when the first cavity portion and the second cavity portion are formed, the frequency is changed in two stages. For example, in the first stage, AC etching is performed at 0.2 Hz to 7 Hz, and preferably at 0.2 Hz to 6 Hz. In the second stage, AC etching is performed at 3 Hz to 120 Hz, and preferably at 4 Hz to 60 Hz. It is to be noted that the frequency is higher in the second stage than in the first stage. When the first cavity portion, the second cavity portion and the third cavity portion are formed, the frequency is changed in three stages. For example, in the first stage, AC etching is performed at 0.2 Hz to 7 Hz and preferably at 0.2 Hz to 6 Hz. In the second stage, AC etching is performed at 1 Hz to 20 Hz and preferably at 2 Hz to 15 Hz. In the third stage, AC etching is performed at 3 Hz to 120 Hz and preferably at 4 Hz to 60 Hz. It is to be noted that the frequency is set to be higher in the second stage than in the first stage, and set to be higher in the third stage than in the second stage. In addition, before forming the first cavity portion, alkali treatment or acid treatment can also be performed for the purpose of degreasing the surface of the base material.

For example, even when the size of each pit formed by etching is relatively small, these small-sized pits are coupled to each other to form one large pit, or a part of the base material existing between the continuously coupled pits becomes detached from the base material itself, so that a relatively large pit may be formed. Thus, also in electrolytic capacitor-specific electrode member 20 in the present invention, each pit formed by etching in the aqueous solution containing hydrochloric acid is equal in size to the second cavity portion. However, as a result of coupling the second cavity portions to each other in the surface layer of the base material, the first cavity portion larger than the second cavity portion can be formed together with the second cavity portion.

Such a forming method is particularly preferable when the first cavity portion is formed in a crater shape, but can be performed by each of DC etching, AC etching and chemical etching.

Furthermore, as in the case where the third cavity portion is also formed, the first cavity portion and the second cavity portion may also be formed as a result of coupling the third cavity portions to each other in the surface layer of the base material. However, the cavity portions formed in this way are also included in electrolytic capacitor-specific electrode member 20 in the present invention.

In addition, the same conditions does not necessarily have to be applied during formation of a cavity portion, but the conditions may be modified appropriately in accordance with the degree of formation progress of a cavity portion also in the method of manufacturing electrolytic capacitor-specific electrode member 20 in the present invention. Furthermore, for modifying the conditions, the steps other than the etching step and not for directly forming a cavity portion may be performed, for example, between AC etching and AC etching, also in the method of manufacturing electrolytic capacitor-specific electrode member 20 in the present invention.

Furthermore, in the case where electrolytic capacitor-specific electrode member 20 in the present invention is formed by the above-described method, dissolution of aluminum is facilitated by adding Ni. Accordingly, it is preferable that an aluminum material containing 5 ppm to 150 ppm of Ni is used as a base material.

Furthermore, in addition to etching in an aqueous solution containing hydrochloric acid or the like, the method of manufacturing of electrolytic capacitor-specific electrode member 20 in the present invention may include: a physical method such as sputter etching for causing ions to collide with the surface of the base material, and plasma etching using an electron beam; and a mechanical method such as blast treatment for causing collision of small particles.

Furthermore, for vapor deposition and powder adhesion (including sintering), for example, vapor deposition particles and powder (including particles that can be sintered) are densely disposed in the vicinity of the surface layer of the base material such that voids are reduced. Then, when each of the vapor deposition layer and the powder adhesion layer (including a sintered layer) becomes closer to the target thickness, vapor deposition particles and powder are disposed while changing the conditions such that larger voids also coexist. Thereby, a plurality of types of cavity portions having different sizes can be formed.

For the purpose of simplifying the step of manufacturing an electrolytic capacitor, etching, particularly etching in an aqueous solution containing hydrochloric acid and the like, is more preferable than vapor deposition and powder adhesion (including sintering).

3. Electrolytic Capacitor

An electrolytic capacitor in the present invention includes: the electrolytic capacitor-specific electrode member; a counter electrode member disposed so as to face the electrolytic capacitor-specific electrode member; and an electrolyte disposed between the electrolytic capacitor-specific electrode member and the counter electrode member. Preferably, the electrolyte is a solid electrolyte containing a conductive polymer.

Figure 15:
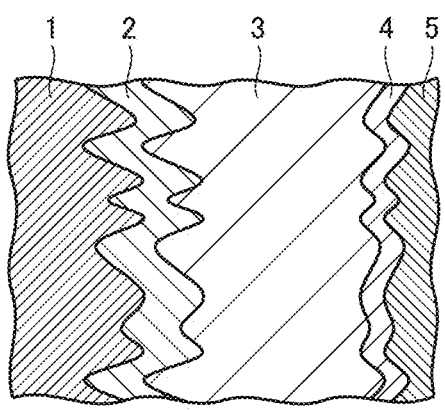
FIG. 15 is a diagram schematically showing a conventional electrolytic capacitor.
Figure 16:
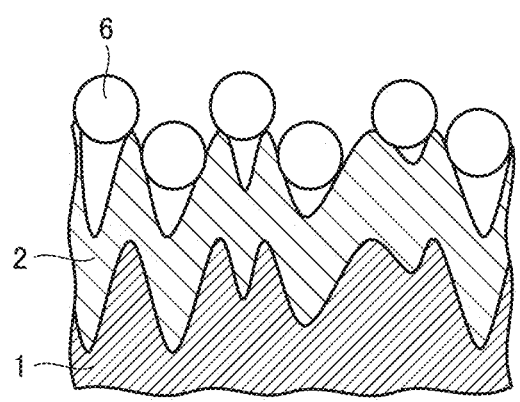
FIG. 16 is a diagram schematically showing the degree of impregnation with a solid electrolyte in a conventional electrolytic capacitor-specific electrode member.

Specifically, the electrolytic capacitor in the present invention is approximately identical in configuration to the electrolytic capacitor shown in FIG. 15, except that the electrolytic capacitor-specific electrode member according to the present embodiment is used as an anode body.

More specifically, the electrolytic capacitor in the present invention includes: an anode body; a dielectric formed on the anode body; an electrolyte disposed adjacent to the dielectric on the opposite side to the anode body; and a cathode body as a counter electrode member disposed so as to face anode body 1 with the electrolyte interposed between this cathode body and the anode body.

(1) Dielectric

When electrolytic capacitor-specific electrode member 20 in the present invention is used as an anode body, a dielectric film is formed on its surface, which may be formed, for example, by a method such as anodization in an aqueous solution of ammonium borate, ammonium phosphate, adipic acid ammonium, and the like.

(2) Electrolyte

There are two types of electrolytic capacitors including: an electrolytic capacitor containing a liquid-state electrolyte (an electrolytic solution for driving); and an electrolytic capacitor containing a solid-state electrolyte (a solid electrolyte). Electrolytic capacitor-specific electrode member 20 in the present invention can be used for each of these two types of electrolytic capacitors. Also, in the electrolytic capacitor in the present invention, an electrolytic solution for driving and a solid electrolyte that have been conventionally used for an electrolytic capacitor can be used.

Examples of the electrolytic solution for driving may contain polyethylene glycol, γ-butyrolactone and the like as a solvent: and examples of the conductive polymer in a solid electrolyte may contain polypyrrole, polythiophene, polyfuran, polyaniline, a derivative thereof or the like.

(3) Cathode Body

In the case where electrolytic capacitor-specific electrode member 20 in the present invention is used as an anode body, and when an electrolyte is an electrolytic solution for driving, the cathode body can be formed using a cathode foil having the same configuration as the cathode used for an electrolytic capacitor when an anode body is formed in a foil shape. On the other hand, when an electrolyte is a solid electrolyte, the cathode body can also be formed using a cathode foil as in the case where an electrolytic solution for driving is used, and a stacked body formed of a carbon layer and a silver paste layer can also be used, for example.

(4) Main Material of Other Electrolytic Capacitors

A separator inserted between an anode body and a cathode body, an anode terminal connected to an anode body, a cathode terminal connected to a cathode body, an aluminum case, and a sealing rubber can be those that have been conventionally used for an electrolytic capacitor.

(5) Method of Manufacturing Electrolytic Capacitor

The following is an explanation about one example of a manufacturing method used in the case where electrolytic capacitor-specific electrode member 20 in the present invention is used as an anode body and an electrolytic solution for driving is used as an electrolyte.

A dielectric is formed by anodization on the surface of the anode body. Then, an anode terminal is connected by laser welding or the like to the anode body having the dielectric formed thereon. A separator and a cathode foil having a cathode terminal connected thereto are sequentially wound around the anode body having a surface on which the dielectric is formed. The anode body and the cathode foil wound therearound are impregnated with an electrolytic solution for driving as an electrolyte.

The anode body and the cathode foil that are impregnated with the electrolytic solution for driving are housed in an aluminum case. Then, the opening of the aluminum case is sealed by a sealing rubber.

The following is an explanation about another example of a manufacturing method used in the case where electrolytic capacitor-specific electrode member 20 in the present invention is used as an anode body and a solid electrolyte is used as an electrolyte.

A dielectric is formed by anodization on the surface of an anode body. Then, an anode terminal is connected by laser welding or the like to an anode body having a dielectric formed thereon. A separator and a cathode foil having a cathode terminal connected thereto are sequentially wound around the anode body having a surface on which the dielectric is formed.

Then, a conductive polymer layer as a solid electrolyte is formed between the anode body and the cathode foil wound therearound. The conductive polymer layer can be formed by: chemical oxidation polymerization for causing a polymerization reaction to occur by alternately applying (i) a monomer as a precursor of a polymer and (ii) a reaction solution made of a dopant and an oxidizing agent; electrolytic polymerization for causing a polymerization reaction to electrochemically occur in a reaction solution; a method of applying a solution in which conductive polymers exhibiting conductivity in advance are dissolved or dispersed in an arbitrary solvent; and the like. Furthermore, a conductive polymer can be formed also by combining the above-described methods.

As an example of combining the above-described methods, a layer is first formed by the method of using a dispersion solution, which is followed by chemical oxidation polymerization and electrolytic polymerization, in consideration of the chemical stress applied to electrolytic capacitor-specific electrode member 20. As a dispersion solution, poly(3,4-ethylenedioxythiophene) dispersion liquid and the like are commercially available, for example. Then, the anode body and the cathode foil having conductive polymers formed therebetween are housed in an aluminum case. Then, the opening of the aluminum case is sealed by a sealing rubber.

Also, an example of another manufacturing method will be hereinafter described. A dielectric is formed by anodization on the surface of an anode body. Then, in order to provide a cathode portion so as to cover the anode body on one end of the anode body, an insulating belt is formed in a portion between one end and the other end of the anode body. Thereby, the anode body is divided into: a cathode portion formation region where a cathode portion is formed on one end side; and an anode body exposure portion where the anode body is exposed on the other end side.

Examples of a method of forming an insulating belt may be: a method of forming an insulator inside the surface layer and the surface area enlargement layer of the base material; a method of forming an insulator by removing the surface area enlargement layer; and the like.

Then, a solid electrolyte layer is formed on the dielectric in the cathode portion formation region. Thereafter, a carbon layer and a silver paste layer are sequentially formed on the solid electrolyte layer. The carbon layer and the silver paste layer form a cathode portion.

Then, a cathode terminal is connected to the silver paste layer with an electrically conductive adhesive or the like. Also, the anode body exposure portion is connected to an anode terminal. Each of terminal materials may, for example, be a metal piece, a metal lead material, a printed wiring board pattern, and the like. Also, each of terminal materials can be connected by laser welding, resistance welding, ultrasonic welding, and the like. Each of terminal materials may also be made of a conductive resin, an electrically conductive adhesive, metal plating, and the like.

Then, molding is performed using a sealing material containing a resin. In the example of another manufacturing method, the electrolytic capacitor in the present invention may also include a parallel arrangement of anode bodies with a cathode body made of a carbon layer and a silver paste layer interposed therebetween, and a plurality of stacks of such parallel arrangements.

4. Evaluation Method (1) Structure of First Cavity Portion and Second Cavity Portion The surface layer of electrolytic capacitor-specific electrode member 20 having the first cavity portion and the second cavity portion formed therein is observed by a scanning electron microscope or a microscope to obtain an image.

The obtained image is subjected as required to binarization processing using image-analysis software, to calculate the circle equivalent diameter of each cavity portion in the observed field of view. Then, the number of cavity portions included in the range of 0.5 μm to 250 μm and the number of other cavity portion are calculated and converted into number per $mm^2$.

Then, electrolytic capacitor-specific electrode member 20 having the first cavity portion and the second cavity portion formed therein are cut perpendicular to the longitudinal direction. The obtained cross section in the vicinity of the surface layer is observed with a scanning electron microscope. The opening diameter in this cross-sectional photograph is not necessarily a circle. In this case, the depth of the cavity portion is measured that has an opening diameter represented by a circle equivalent diameter included in the range of approximately 0.5 μm to 250 μm.

(2) Capacitance and Capacitance Appearance Ratio

By an LCR meter with a measuring frequency of 120 Hz, the capacitance of electrolytic capacitor-specific electrode member 20 before immersion in a conductive polymer solution is measured in an adipic acid ammonium aqueous solution or an ammonium borate aqueous solution in accordance with the aqueous solution used during anodization. Then, the capacitance of the manufactured capacitor is measured by the LCR meter with a measuring frequency of 120 Hz. The capacitance appearance ratio is calculated from the capacitance of the capacitor and the capacitance of electrolytic capacitor-specific electrode member 20 in the aqueous solution.

(3) Leakage Current

The current value after one-minute application of a rated voltage to a solid electrolytic capacitor is measured. The leakage current is calculated from the following equation 1.

Leakage current=current value(μA) after one-minute application of rated voltage/capacitance(μF) of capacitor measured at 120 Hz·rated voltage(V))    (Equation 1)

EXAMPLES

In the following, the present invention will be described in detail with reference to Examples and Comparative Examples of the present invention, but the present invention is not limited to Examples thereby.

Example 1

(1) For a base material in the state before formation of a cavity portion, the following conditions were employed.

(I) Shape: a cylindrical shape having a circular cross-sectional shape that is perpendicular to the longitudinal direction.

(II) Component: an aluminum material with a purity of 99.99% and not containing Ni.

(III) Diameter: 0.2 mm.

(IV) Length: 1.0 mm.

(2) After performing acid treatment for the purpose of degreasing the base material surface, AC etching was performed in an aqueous solution containing 4.5 wt % of hydrochloric acid, 0.9 wt % of sulfuric acid, and 2.0 wt % of aluminum chloride, on the conditions of: a current density of 280 mA/cm$^2$; and a current waveform (half wave) of a triangular wave, such that the thickness of the layer having a cavity portion formed therein is about 65 μm. In addition, on the condition of changing the frequency in two stages, the frequency was set at 1 Hz in the preceding stage and at 60 Hz in the subsequent stage. Furthermore, the solution temperature was set at 45° C. in the preceding stage and at 35° C. in the subsequent stage. When AC etching ended, acid treatment was then performed for the purpose of removing chlorine ions. Thereby, electrolytic capacitor-specific electrode member 20 (an anode body) was prepared.

(3) In an adipic acid ammonium aqueous solution, a voltage of 3V was applied to electrolytic capacitor-specific electrode member 20 to anodize electrolytic capacitor-specific electrode member 20.

(4) A separator and a cathode foil for electrolytic capacitor were sequentially wound around electrolytic capacitor-specific electrode member 20 having a dielectric (an oxide film) formed thereon by anodization.

(5) Electrolytic capacitor-specific electrode member 20 and cathode foil wound therearound were immersed in commercially available PEDOT/PSS 1.0 wt % in H$_2$O (high-conductivity grade Orgacon (registered trademark) HIL-1005 (product number: 768642)) manufactured by SIGMA-ALDRICH, and thereafter, dried. This process was repeatedly performed a prescribed number of times to form a solid electrolyte layer between electrolytic capacitor-specific electrode member 20 and the cathode foil.

(6) Electrolytic capacitor-specific electrode member 20 and the cathode foil having the solid electrolyte layer formed therebetween were housed in an aluminum case. Then, the opening of the aluminum case was sealed by a sealing rubber.

Example 2

Except that: the frequency in AC etching was changed in three stages; that the frequency was set at 1 Hz in the preceding stage, at 10 Hz in the intermediate stage and at 60 Hz in the subsequent stage; and that the solution temperature was set at 45° C. in each of the preceding and intermediate stages and at 35° C. in the subsequent stage, electrolytic capacitor-specific electrode member 20 and an electrolytic capacitor were manufactured in the same manner as in Example 1.

Example 3

Except that the first frequency was set at 0.2 Hz that is one-fifth of the frequency in Example 1 when the frequency in AC etching was changed in three stages, electrolytic capacitor-specific electrode member 20 and an electrolytic capacitor were manufactured in the same manner as in Example 2.

Example 4

Except that the first frequency was set at 5 Hz that is five times as high as the frequency in Example 1 when the frequency in AC etching was changed in three stages, electrolytic capacitor-specific electrode member 20 and an electrolytic capacitor were manufactured in the same manner as in Example 2.

Example 5

Except that a prism-shaped member having a square cross-sectional shape perpendicular to the longitudinal direction and having four sides each having a length of 0.16 mm was used as a base material in the state before formation of a cavity portion, electrolytic capacitor-specific electrode member 20 and an electrolytic capacitor were manufactured in the same manner as in Example 2.

Example 6

Except that an aluminum material with a purity of 99.99% and containing 50 ppm of Ni was used as a base material, electrolytic capacitor-specific electrode member 20 and an electrolytic capacitor were manufactured in the same manner as in Example 2.

Comparative Example 1

Except that the frequency in AC etching was fixed at 60 Hz and the solution temperature was fixed at 45° C., electrolytic capacitor-specific electrode member 20 and an electrolytic capacitor were manufactured in the same manner as in Example 1.

Example 7

(1) The following conditions were used for a base material in the state before forming a cavity portion.

(I) Shape: a cylindrical shape having a circular cross-sectional shape perpendicular to the longitudinal direction.

(II) Component: an aluminum material with a purity of 99.99% and not containing Ni.

(III) Diameter: 0.8 mm.

(IV) Length: 3.0 mm.

(2) After performing acid treatment for the purpose of degreasing the base material surface, DC etching was performed in an aqueous solution containing 1.8 wt % of hydrochloric acid, 23 wt % of sulfuric acid and 15 wt % of aluminum sulfate on the conditions of: a current density of 50 mA/cm$^2$; a quantity of electricity of 3 C/cm$^2$; and a solution temperature of 72° C. Furthermore, for the purpose of enlarging the tunnel-shaped first cavity portion formed by DC etching, chemical etching was performed for 10 minutes at a solution temperature of 75° C. in an aqueous solution containing 1.0 wt % of nitric acid and 12 wt % of aluminum nitrate. Then, in an aqueous solution containing 4.5 wt % of hydrochloric acid, 0.9 wt % of sulfuric acid, and 2.0 wt % of aluminum chloride, AC etching was performed on the conditions of: a solution temperature of 35° C.; a current density of 280 mA/cm$^2$; a frequency of 60 Hz; and a current waveform (half wave) of a triangular wave. After performing AC etching, acid treatment was performed for the purpose of removing chlorine ions. Thereby, electrolytic capacitor-specific electrode member 20 was prepared.

(3) In an ammonium borate aqueous solution, a voltage of 200V was applied to electrolytic capacitor-specific electrode member 20 to anodize electrolytic capacitor-specific electrode member 20.

(4) A separator and a cathode foil for electrolytic capacitor were sequentially wound around electrolytic capacitor-specific electrode member 20 having a dielectric (an oxide film) formed thereon by anodization.

(5) Electrolytic capacitor-specific electrode member 20 and the cathode foil wound therearound were immersed in commercially available PEDOT/PSS 1.0 wt % in H$_2$O (high-conductivity grade Orgacon (registered trademark) HIL-1005 (product number: 768642)) manufactured by SIGMA-ALDRICH, and thereafter, dried. This process was repeatedly performed a prescribed number of times to form a solid electrolyte layer between electrolytic capacitor-specific electrode member 20 and the cathode foil.

(6) Electrolytic capacitor-specific electrode member 20 and the cathode foil having the solid electrolyte layer formed therebetween were housed in an aluminum case. Then, the opening of the aluminum case was sealed by a sealing rubber.

Comparative Example 2

Except that only AC etching was performed without performing DC etching and chemical etching, electrolytic capacitor-specific electrode member 20 and an electrolytic capacitor were manufactured in the same manner as in Example 7.

With regard to Examples 1 to 7 and Comparative Examples 1 and 2, Table 1 shows the structure of a cavity portion, and Table 2 shows the capacitance, the capacitance appearance ratio and the leakage current of the capacitor in an aqueous solution for electrolytic capacitor-specific electrode member 20 after anodization and before immersion in a conductive polymer solution.

As to each unit in Table 1, the opening diameter and the depth are expressed as "μm" and the density is expressed as "×10$^3$ pieces/mm$^2$".

Furthermore, Table 2 shows the value of capacitance in each of Examples 1 to 6 based on the value defined as 100 in Comparative Example 1, and shows the value of capacitance in Example 7 based on the value defined as 100 in Comparative Example 2. The capacitance appearance ratio is expressed as "%". The leakage current is expressed as "μA/(μF·V)".

TABLE 1

| | First Cavity Portion | | | | | | |
|---|---|---|---|---|---|---|---|
| | Shape | Opening Diameter (μm) | Depth (μm) | Density (×10$^3$ pieces/mm$^2$) | Second Cavity Portion | Third Cavity Portion | Other Cavity Portions |
| Example 1 | Crater | 5-10 | 2-5 | 4.5 | Approximately Cubic | None | None |
| Example 2 | Crater | 5-10 | 2-5 | 4.5 | Crater | Approximately Cubic | None |
| Example 3 | Crater | 10-50 | 5-25 | 4.5 | Crater | Approximately Cubic | None |
| Example 4 | Crater | 1-5 | 0.25-2.5 | 4.5 | Crater | Approximately Cubic | None |
| Example 5 | Crater | 5-10 | 2-5 | 4.5 | Crater | Approximately Cubic | None |
| Example 6 | Crater | 5-20 | 2-10 | 4.5 | Crater | Approximately Cubic | None |
| Comparative Example 1 | None | — | — | — | None | None | Approximately Cubic |
| Example 7 | Crater | 5-10 | 2-5 | 4.5 | Tunnel | Approximately Cubic | None |
| Comparative Example 2 | None | — | — | — | None | None | Approximately Cubic |

TABLE 2

| | Voltage (V) during Formation of Dielectric | Capacitance of Electrode Member | Capacitance Appearance Ratio (%) | Leakage Current (μA/(μF · V)) |
|---|---|---|---|---|
| Example 1 | 3 | 98 | 83.9 | 0.6 × 10$^{-2}$ |
| Example 2 | 3 | 95 | 86.2 | 0.4 × 10$^{-2}$ |
| Example 3 | 3 | 98 | 85.9 | 0.5 × 10$^{-2}$ |
| Example 4 | 3 | 92 | 86.1 | 0.5 × 10$^{-2}$ |
| Example 5 | 3 | 88 | 80.8 | 1.0 × 10$^{-2}$ |
| Example 6 | 3 | 98 | 84.7 | 1.0 × 10$^{-2}$ |
| Comparative Example 1 | 3 | 100 | 61.5 | 1.2 × 10$^{-2}$ |
| Example 7 | 200 | 108 | 98.9 | 0.1 × 10$^{-2}$ |
| Comparative Example 2 | 200 | 100 | 84.3 | 0.6 × 10$^{-2}$ |

Figure 11:
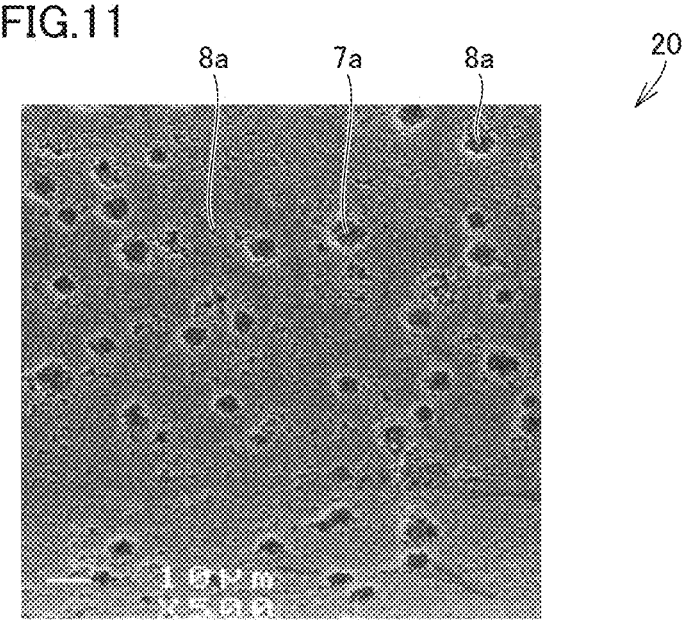
FIG. 11 is a scanning electron microscope photograph of a surface layer of an electrolytic capacitor-specific electrode member according to Example 1 that is taken from the direction perpendicular to the axial direction.

The surface layer of electrolytic capacitor-specific electrode member 20 before anodization in Example 1 was observed with a scanning electron microscope from the direction perpendicular to the axial direction, to obtain a photograph as shown in FIG. 11. A large number of crater-shaped first cavity portions 7a each having an opening diameter on the order of about 5 μm to about 10 μm were formed in the surface layer of electrolytic capacitor-specific electrode member 20. Furthermore, the inner wall of each crater-shaped first cavity portion 7a had projections and depressions. In other words, a large number of second cavity portions that are opened in the inner wall of crater-shaped first cavity portion 7a were formed. Furthermore, cavity portions each having an opening diameter not reaching the order of about 5 μm to about 10 μm were also formed in the surface layer of electrolytic capacitor-specific electrode member 20. In other words, the second cavity portions opened to the outside were also formed in the surface layer of electrolytic capacitor-specific electrode member 20.

Figure 12:
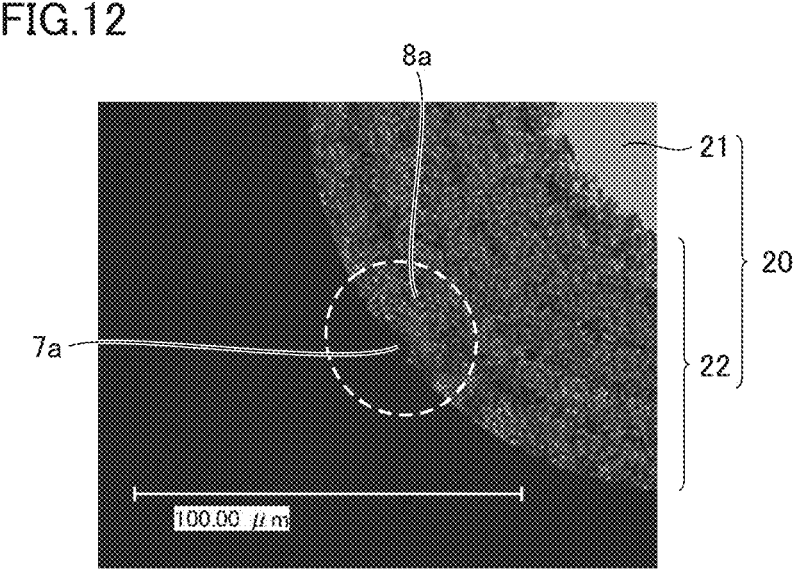
FIG. 12 is a scanning electron microscope photograph of the area in the vicinity of the surface layer obtained when the electrolytic capacitor-specific electrode member according to Example 1 is cut perpendicular to its longitudinal direction (the axial direction).

A scanning electron microscope was used to observe the cross section in the vicinity of the surface layer obtained when electrolytic capacitor-specific electrode member 20 before anodization in Example 1 was cut perpendicular to its longitudinal direction. Then, a photograph as shown in FIG. 12 was obtained. In Example 1, in the vicinity of the surface layer of electrolytic capacitor-specific electrode member 20, a crater-shaped first cavity portion 7a having an opening diameter on the order of about 10 μm was formed while a large number of cavity portions 8a smaller than first cavity portion 7a were formed.

Figure 13:
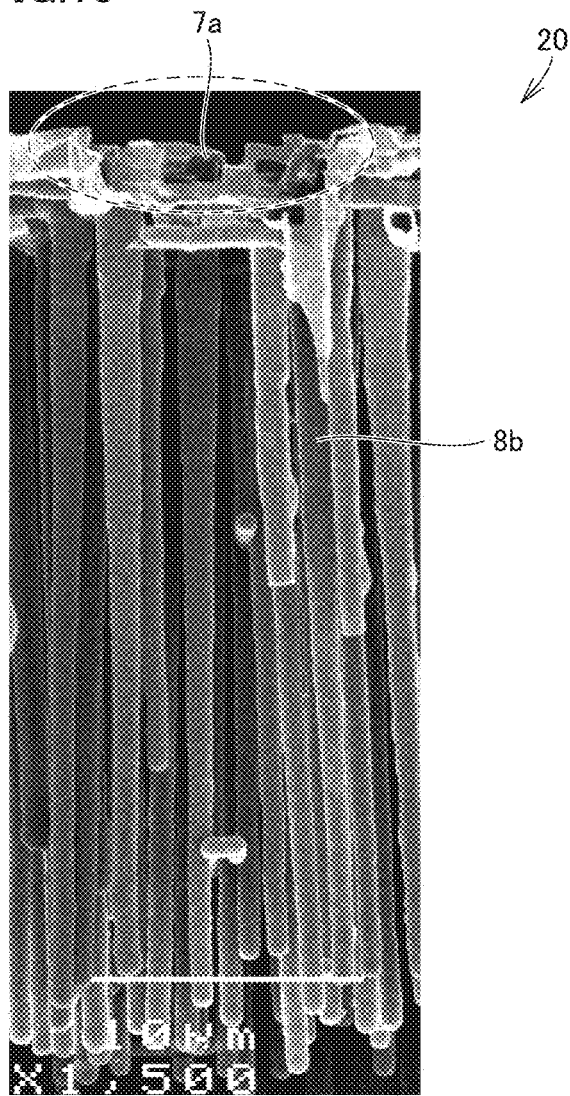
FIG. 13 is a scanning electron microscope photograph of the area in the vicinity of a surface layer obtained when an electrolytic capacitor-specific electrode member according to Example 7 is cut perpendicular to its longitudinal direction (the axial direction) in the state after DC etching and before AC etching.

In Example 7, a scanning electron microscope was used to observe the area in the vicinity of the surface layer obtained when electrolytic capacitor-specific electrode member 20 was cut perpendicular to its longitudinal direction in the state after DC etching and before AC etching. Then, a photograph as shown in FIG. 13 was obtained. According to the observation results in Example 7, in the vicinity of the surface layer of electrolytic capacitor-specific electrode member 20, a crater-shaped first cavity portion 7a having an opening diameter on the order of about 10 μm was formed while tunnel-shaped second cavity portion 8b having an opening diameter on the order of about 2 μm was formed.

Figure 14:
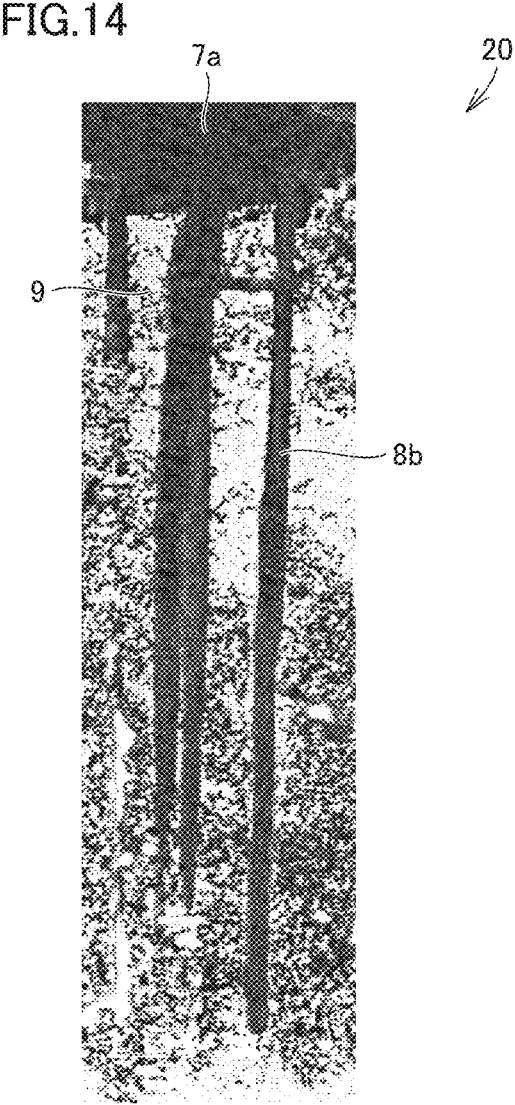
FIG. 14 is a scanning electron microscope photograph of the area in the vicinity of the surface layer obtained when the electrolytic capacitor-specific electrode member according to Example 7 is cut perpendicular to its longitudinal direction (the axial direction) in the state after AC etching performed after DC etching.

In Example 7, a scanning electron microscope was used to observe the area in the vicinity of the surface layer obtained when electrolytic capacitor-specific electrode member 20 after DC etching and AC etching and before anodization was cut perpendicular to its longitudinal direction. Then, a photograph as shown in FIG. 14 was obtained. In the vicinity of the surface layer of electrolytic capacitor-specific electrode member 20, crater-shaped first cavity portion 7a having an opening diameter on the order of about 10 μm was formed while tunnel-shaped second cavity portion 8b having an opening diameter on the order of about 2 μm was formed. In addition, a third cavity portion 9 microscopically smaller than second cavity portion 8b was formed in the inner wall of each of tunnel shape second cavity portion 8b and crater-shaped first cavity portion 7a. Also, the third cavity portion opened to the outside was formed.

When comparing Examples 1 to 6 with Comparative Example 1 and comparing Example 7 with Comparative Example 2, the leakage current was suppressed more in Examples than in Comparative Examples, and the capacitance appearance ratio was higher in Examples than in Comparative Examples in any case. The difference between Examples and Comparative Examples depends on whether the first cavity portion is formed or not. Microscopic cavity portions are formed approximately in the same manner in Examples and Comparative Examples. Therefore, based on the above-described comparisons, it can be recognized as being experimentally confirmed that, irrespective of the working voltage in the electrolytic capacitor, the surface layer of electrolytic capacitor-specific electrode member 20 includes the first cavity portion having a large opening diameter different from each microscopic cavity portion, so that the capacitance appearance ratio can be enhanced while suppressing a leakage current.

When comparing Example 1 with Example 2, the capacitance appearance ratio is higher in Example 2 than in Example 1. Thus, it was confirmed that the capacitance appearance ratio becomes higher when crater-shaped second cavity portions smaller than the first cavity portions are first formed and then microscopically smaller cavity portions are formed, than when microscopic cavity portions contributing to enlargement of the surface area of electrolytic capacitor-specific electrode member 20 are exclusively formed in the inner wall of the crater-shaped first cavity portion.

The capacitance appearance ratio is approximately equal in Examples 2 to 4. Thus, it was confirmed that the equal capacitance appearance ratio is obtained when the first cavity portion has an opening diameter of 1 μm to 50 μm and a depth of 0.5 μm to 25 μm.

When comparing Example 2 with Example 5, the capacitance appearance ratio is higher in Example 2 than in Example 5. In each of Examples 2 and 5, in a macroscopic view, the cross-sectional shape of electrolytic capacitor-specific electrode member 20 taken along the direction perpendicular to its longitudinal direction is identical to the cross-sectional shape of the base material taken along the direction perpendicular to its longitudinal direction. The cross-sectional shape of the base material in Example 2 is a circular shape. The cross-sectional shape of the base material in Example 5 is a square shape. Thus, in a macroscopic view, the cross-sectional shape of electrolytic capacitor-specific electrode member 20 is a circular shape in Example 2, and the cross-sectional shape of electrolytic capacitor-specific electrode member 20 is a square shape in Example 5. Accordingly, it was confirmed that the capacitance appearance ratio is higher in a circular shape than in an angular shape like a square shape. In other words, in a macroscopic view, it was confirmed that a higher capacitance appearance ratio is obtained when the cross-sectional shape of electrolytic capacitor-specific electrode member 20 in the axial direction has an annular shape not having an angular portion.

In each of Examples 2 and 6, the first cavity portion has a crater shape, but the opening diameter and the depth are larger in Example 6 than in Example 2. Thus, it was confirmed that the crater-shaped first cavity portion can be formed more readily by using a base material in which Ni is intentionally contained.

In Comparative examples 1 and 2, other conditions are almost the same as those in Examples. Also, the results show that a leakage current is increased when the frequency in AC etching is fixed. However, even when the frequency in AC etching is fixed, but when the current density, the temperature, the compositions of the aqueous solution and the like are changed as appropriate to form the first cavity portion and the second cavity portion as described in the embodiments, the capacitance appearance ratio can be enhanced while suppressing a leakage current as in Examples.

Although the embodiments and the examples of the present invention have been described as above, the embodiments and the examples disclosed herein are illustrative and non-restrictive in every respect. The scope of the present invention is defined by the terms of the claims, and is intended to include any modifications within the meaning and scope equivalent to the terms of the claims.

INDUSTRIAL APPLICABILITY

The present invention can be utilized for manufacturing an electrolytic capacitor for which a high capacitance appearance ratio is required, and particularly, a solid electrolytic capacitor. In addition, the electrolytic capacitor manufactured in the present invention is not particularly limited in application and the like, but can be used for a filter for attenuating a noise, for example.

REFERENCE SIGNS LIST 1 anode body, 2 dielectric, 3 electrolyte, 4 dielectric, 5 cathode body, 6 solid electrolyte, 7a, 7b first cavity portion, 8a, 8b, 8c second cavity portion, 9 third cavity portion, 10 base material, 11 protrusion, Ila curved portion, 12 recess, 12a curved portion, 20 electrolytic capacitor-specific electrode member, 21 core portion, 22 porous portion.

The invention claimed is:

1. An electrolytic capacitor-specific electrode member included in an electrolytic capacitor,
   the electrolytic capacitor-specific electrode member having a wire shape,
   the electrolytic capacitor-specific electrode member having an outer surface including:
     at least one first cavity portions opened to outside; and
     at least one second cavity portions opened at least to the first cavity portions,
   the second cavity portions being smaller in opening diameter represented by a circle equivalent diameter than the first cavity portions; wherein
     a plurality of the first cavity portions includes first cavity portions
       each having an opening diameter represented by a circle equivalent diameter of 1 µm or more and 500 µm or less and/or a depth of 0.5 µm or more and 250 µm or less, and
       existing in a density of 1 piece/mm$^2$ or more and $2.0\times10^5$ pieces/mm$^2$ or less.

2. The electrolytic capacitor-specific electrode member according to claim 1, wherein the outer surface further includes a microscopic third cavity portion opened to the second cavity portions.

3. The electrolytic capacitor-specific electrode member according to claim 1, wherein the first cavity portions have a crater shape or a tunnel shape.

4. The electrolytic capacitor-specific electrode member according to claim 1, wherein
   in a macroscopic view of a cross-sectional shape of the electrolytic capacitor-specific electrode member that is perpendicular to an axial direction of the electrolytic capacitor-specific electrode member, the cross-sectional shape has a peripheral edge formed in an annular shape not having an angular portion.

5. The electrolytic capacitor-specific electrode member according to claim 1, wherein the electrolytic capacitor-specific electrode member is formed of an aluminum material containing 5 ppm or more and 150 ppm or less of Ni.

6. An electrolytic capacitor comprising:
   the electrolytic capacitor-specific electrode member according to claim 1;
   a counter electrode member disposed to face the electrolytic capacitor-specific electrode member; and
   an electrolyte disposed between the electrolytic capacitor-specific electrode member and the counter electrode member.

7. The electrolytic capacitor according to claim 6, wherein the electrolyte is a solid electrolyte containing a conductive polymer.

* * * * *